United States Patent
Eisinger et al.

(10) Patent No.: US 10,436,478 B2
(45) Date of Patent: Oct. 8, 2019

(54) STRUCTURAL FRAME AND SOLAR COLLECTOR MODULE

(75) Inventors: Joseph Eisinger, Lakewood, CO (US); Kerry Manning, Lakewood, CO (US); Patrick Marcotte, Lakewood, CO (US); Nathan Stegall, Lakewood, CO (US)

(73) Assignee: Abengoa Solar LLC, Lakewood, CO (US)

( * ) Notice: Subject to any disclaimer, the term of this patent is extended or adjusted under 35 U.S.C. 154(b) by 806 days.

(21) Appl. No.: 14/112,017

(22) PCT Filed: Apr. 19, 2012

(86) PCT No.: PCT/US2012/034254
§ 371 (c)(1),
(2), (4) Date: Dec. 10, 2013

(87) PCT Pub. No.: WO2012/145513
PCT Pub. Date: Oct. 26, 2012

(65) Prior Publication Data
US 2014/0144428 A1 May 29, 2014

Related U.S. Application Data

(60) Provisional application No. 61/476,964, filed on Apr. 19, 2011.

(51) Int. Cl.
*F24J 2/54* (2006.01)
*F24S 23/71* (2018.01)
(Continued)

(52) U.S. Cl.
CPC .............. *F24S 23/71* (2018.05); *B21D 53/02* (2013.01); *F24S 23/74* (2018.05); *F24S 25/13* (2018.05);
(Continued)

(58) Field of Classification Search
CPC ...... F24J 2/14; F24J 2/5233; F24J 2/12; F24J 2/541; B21D 53/02; E04C 2003/0495
(Continued)

(56) References Cited

U.S. PATENT DOCUMENTS 3,399,914 A 9/1968 Grant
3,722,153 A 3/1973 Baer
(Continued)

FOREIGN PATENT DOCUMENTS

DE 2720029 A1 11/1977
DE 10301883 B3 4/2004
(Continued)

OTHER PUBLICATIONS

International Search Report and Written Opinion of PCT/US12/34254 dated Mar. 26, 2013, 19 pages.
(Continued)

*Primary Examiner* — Avinash A Savani
*Assistant Examiner* — Rabeeul I Zuberi
(74) *Attorney, Agent, or Firm* — Kilpatrick Townsend & Stockton LLP

(57) ABSTRACT

Solar collector modules and techniques for their construction are disclosed. In one aspect, a solar collector module includes a reflector and a three-dimensional structural frame that supports the reflector. The structural frame includes a set of primary structural shapes and a set of axial frame members connected between corners of the primary structural shapes forming helical paths for the transmission of torque from one end of the structural frame to the other. In another aspect, a method for assembling a solar collector module includes pre-assembling part of the module.

26 Claims, 18 Drawing Sheets

(51) Int. Cl.
*F24S 30/425* (2018.01)
*B21D 53/02* (2006.01)
*F24S 23/74* (2018.01)
*F24S 25/13* (2018.01)
*F24S 25/60* (2018.01)
*F24S 25/70* (2018.01)
*E04C 3/04* (2006.01)

(52) U.S. Cl.
CPC ............... *F24S 25/60* (2018.05); *F24S 25/70* (2018.05); *F24S 30/425* (2018.05); *E04C 2003/0495* (2013.01); *Y02E 10/45* (2013.01); *Y02E 10/47* (2013.01); *Y10T 29/49355* (2015.01)

(58) Field of Classification Search
USPC .............. 52/633, 652.1, 648.1, 654.1, 173.3; 211/26; 126/694, 696
See application file for complete search history.

(56) References Cited

U.S. PATENT DOCUMENTS

| | | | |
|---|---|---|---|
| 3,783,573 A | 1/1974 | Vaughan | |
| 4,386,600 A * | 6/1983 | Eggert, Jr. | F24J 2/14 126/573 |
| 4,624,599 A * | 11/1986 | Piasecki | B64C 1/06 244/131 |
| 4,655,022 A * | 4/1987 | Natori | B64G 9/00 52/108 |
| 4,677,803 A | 7/1987 | Mikulas, et al. | |
| 4,723,382 A | 2/1988 | Lalvani | |
| 5,265,395 A | 11/1993 | Lalvani | |
| 6,035,850 A * | 3/2000 | Deidewig | F24J 2/1057 126/680 |
| 7,318,303 B1 * | 1/2008 | Kling | E04B 1/19 52/648.1 |
| 9,163,860 B2 | 10/2015 | Munoz | |
| 9,212,831 B2 | 12/2015 | Abascal et al. | |
| 2005/0103326 A1 | 5/2005 | Callahan et al. | |
| 2006/0157050 A1 * | 7/2006 | Le Lievre | F24S 23/70 126/696 |
| 2007/0044415 A1 | 3/2007 | Merrifield et al. | |
| 2009/0272425 A1 * | 11/2009 | Green | F24J 2/07 136/246 |
| 2010/0213336 A1 * | 8/2010 | Del Pico Aznar | F24J 2/14 248/316.8 |
| 2010/0252030 A1 | 10/2010 | Marcotte et al. | |
| 2013/0141807 A1 | 6/2013 | Munoz | |
| 2013/0175229 A1 | 7/2013 | Munoz | |

FOREIGN PATENT DOCUMENTS

| | | |
|---|---|---|
| EP | 1310605 A1 | 5/2003 |
| EP | 1903155 A1 | 3/2008 |
| WO | 2006086808 A1 | 8/2006 |
| WO | WO 2010/024891 A1 | 3/2010 |
| WO | WO 2011/011728 A1 | 1/2011 |
| WO | 2011070180 A1 | 6/2011 |

OTHER PUBLICATIONS

Office Action for Chinese Patent Application No. CN 201280030240.5, dated Feb. 28, 2015, 12 pages.
Extended European Search Report for European Patent Application No. EP 15157250.0, dated Oct. 2, 2015, 6 pages.
Extended European Search Report for European Patent Application. No. EP 15157249.2, dated Oct. 2, 2015, 8 pages.

* cited by examiner

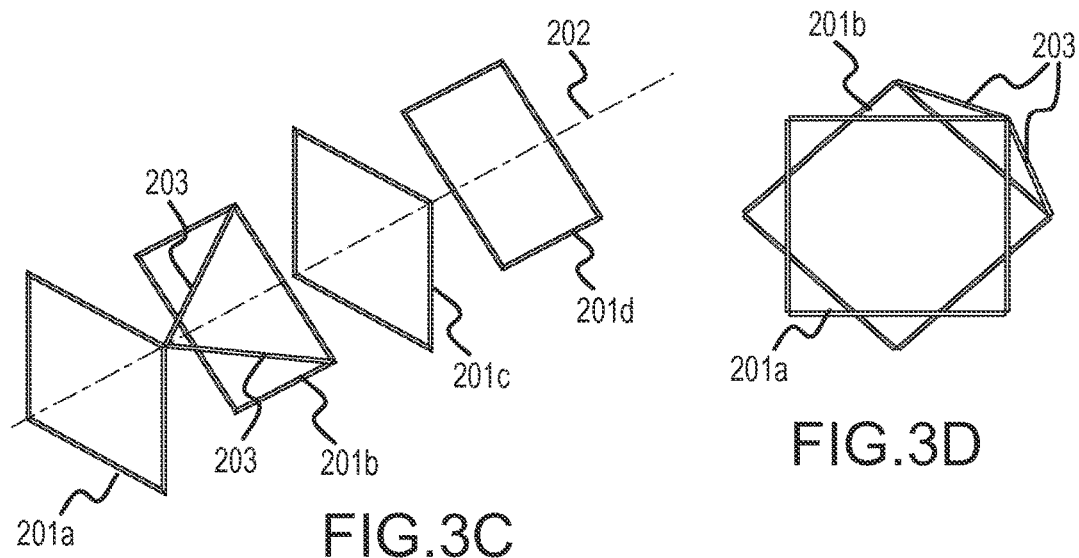
FIG.3C
FIG.3D
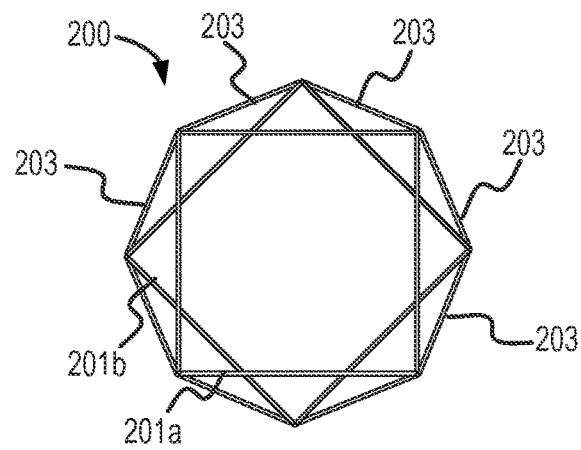
FIG.3E

STRUCTURAL FRAME AND SOLAR COLLECTOR MODULE

CROSS-REFERENCE TO RELATED APPLICATIONS

This Application claims priority to International Patent Application No. PCT/US2012/034254, filed on Apr. 19, 2012 and U.S. Provisional Patent Application No. 61/476,964, filed on Apr. 19, 2011, both entitled STRUCTURAL FRAME AND SOLAR COLLECTOR MODULE, the entire disclosures of which are hereby incorporated by reference for all purposes.

GOVERNMENT RIGHTS

This Invention was made with government support under Contract No. DE-FC36-08GO18037 awarded by the Department of Energy. The Government has certain rights in this invention.

BACKGROUND

The trough solar collector is a well-known collector technology used for Concentrating Solar Power (CSP) plants. As shown in FIG. 1, such a plant typically employs a large array of sun-tracking, focusing reflectors that concentrate incoming solar radiation onto a tubular conduit that contains a working fluid. The focused radiation heats the working fluid, for example an oil or other fluid. The heated working fluid is piped to a central location where its accumulated thermal energy may be utilized in a conventional heat engine, for example to generate steam that drives turbines to produce electric power. In other applications, the heated working fluid may be used directly, for example where the working fluid is heated water for domestic or commercial use. After its thermal energy has been utilized, the working fluid may be recirculated through the collector array to be heated again.

The collector arrays may be quite large, covering several square kilometers and including thousands of collector modules, such as the module 101 shown in the simplified diagram of FIG. 1. Several modules are shown in FIG. 1, each of which has a similar construction. The field or array of collectors may be divided into parallel circuits, so that the working fluid need not be circulated through the entire collector field before it is piped to the central location, but instead may be passed through a single row of a few dozen modules during each heating cycle, for example. Many arrangements of circuits are possible. Each module typically includes a parabolic reflector 102 backed by a frame or truss system 103 on the back side of the reflector (away from the sun). The frame adds rigidity to the module. The modules are typically supported on pylons 104 that are located between the modules.

The collector modules are typically grouped into rotatable solar collector assemblies (SCAs) of several adjacent modules each, connected in a row. That is, an SCA typically includes several collector modules supported by pylons in a linear arrangement, such that the collector modules in each SCA can rotate about a longitudinal axis. For optimum collection efficiency, all the modules in an SCA preferably rotate in unison to track the sun during the day. Each SCA may be moved by a drive mechanism (not shown) near the center of the SCA, at an end of the SCA, or at another location within the SCA. The collector modules in an SCA may be coupled to each other using a conventional torque transfer assembly that includes a central torsion element (shaft) to couple adjacent modules. Alternatively, adjacent modules may be coupled near their edges or rims, so that torque is transmitted between the modules primarily by a force couple acting at the rim and axis of rotation, rather than by torsion of a central shaft. Preferably, the coupling between modules accommodates thermal expansion and contraction of the SCA. More description of systems and methods for "edge drive" torque transfer may be found in co-pending U.S. patent application Ser. No. 12/416,536 filed Apr. 1, 2009 and titled "Torque Transfer Between Trough Collector Modules", the entire disclosure of which is hereby incorporated herein by reference for all purposes.

The SCA modules transfer torque from at least two different sources. First, a drive mechanism located near the center of the SCA applies torque directly to those modules adjacent to the drive mechanism. For the rest of the modules in the SCA, torque is coupled from one module to the next so that the entire group of modules in the SCA rotates in unison. Second, the module arrays are also subject to wind loading, which may exert very large forces and torques on the array. Wind loading on each module is transmitted to the adjacent module. The resulting torque may be smallest at the end modules of an SCA, but may accumulate through the modules in the SCA row until the drive mechanism must resist the accumulated torsional wind loading of many modules. The total applied torque may be as large as hundreds of thousands of Newton-meters. In order to maintain proper aiming of the array toward the sun, the drive mechanism must be able to resist and overcome the torque resulting from wind loading, and the SCA must be stiff enough that no modules deflect enough from optimum aiming that their energy collection performance is degraded significantly. While the torques are greatest near the drive mechanism, and the modules adjacent the drive mechanism must resist the largest torques, the deflection may accumulate outward from the drive mechanism, and may be greatest at the end of the SCA furthest from the drive mechanism.

In order to achieve enough stiffness, the frame or truss system 103 should be designed to withstand the expected torques with acceptably small deflection. Also, the coupling of two or more optically-precise devices, such as the modules of an SCA, requires that the assembly be fabricated with a relatively high degree of precision for proper energy collection. In addition, it is desirable that each module be light in weight, easy to assemble, and low in cost. In large part, these competing design goals—stiffness, accuracy, light weight, ease of assembly, and low cost—are dependent on the design of the frame or truss portion of the collector modules. There is accordingly a need for improved frame designs for use in solar collector modules.

Because the efficiency-over-time of CSP systems is strongly dependent on how much time the reflectors can be exposed to sunlight, CSP systems are usually located in high sunlight areas, which are also usually high temperature environments. These environments are often low-cost desert locations which combine the high amounts of sunlight with large amounts of space to locate many mirrors from which to collect solar energy.

Unfortunately, while deserts provide excellent environments for the collection of solar energy, these same environments are usually detrimental to the physical structures necessary to do so. To collect a significant amount of solar energy for the heat engines, large surface areas of mirrors are necessary. The most economical method of providing and placing the requisite large surface areas of mirrors is to use fewer larger mirror panels rather than many smaller mirror panels. However, as the size of the mirror panels increases, the physical stresses on these mirror panels also increases, due to both the weight of the larger mirror panels themselves, as well as the structures necessary to support them. The high temperature environments also magnify the physical stresses, and over time can distort the precise concave shapes of the mirrors that are necessary to achieve maximum solar reflection to the collection means.

An improved frame structure would provide good torsional strength and stiffness, as well as strength an stiffness in bending, while utilizing material efficiently.

SUMMARY

Embodiments of the invention relate to improvements in the design and construction of concentrating solar collector modules. Aspects of the invention include improvements in the layout of a frame for a solar collector module, and in the joining of structural members of the frame at nodes.

According to one aspect, a solar collector module includes a three-dimensional structural frame, wherein the three-dimensional structural frame includes a set of primary structural shapes spaced apart along a longitudinal axis of the structural frame. Each primary structural shape includes a set of frame members arranged in a polygonal shape. The three-dimensional structural frame also includes a set of axial frame members joining corners of adjacent primary structural shapes such that the axial frame members form helical paths for the transmission of torque from one longitudinal end of the structural frame to the other. The solar collector module further includes a reflector coupled to the three-dimensional structural frame and shaped to concentrate solar radiation onto a receiver. In some embodiments, the solar collector module includes a plurality of composite panels, and each composite panel may be supported at only two spaced-apart locations. In some embodiments, the reflector is cantilevered beyond the edges of the three-dimensional structural frame. The reflector may be in the shape of a parabolic cylinder. In some embodiments, the solar collector module further includes a plurality of reflector support structures, each reflector support structure coinciding with one edge of a respective one of the primary structural shapes. The reflector support structures may coincide with alternate primary structural shapes. In some embodiments, the reflector comprises a plurality of reflector panels, each reflector panel being concave along its width. In some embodiments, the reflector comprises a plurality of reflector panels, each reflector panel being concave along its length.

According to another aspect, a three-dimensional structural frame includes a set of primary structural shapes spaced apart along a longitudinal axis of the structural frame. Each primary structural shape includes a set of frame members arranged in a polygonal shape. The three-dimensional structural frame further includes a set of axial frame members joining corners of adjacent primary structural shapes such that the axial frame members form helical paths for the transmission of torque from one longitudinal end of the structural frame to the other. In some embodiments, each primary structural shape comprises three and only three frame members. In some embodiments, each primary structural shape comprises four and only four frame members. In some embodiments, each primary structural shape comprises five or more frame members. The primary structural shapes may be regular polygonal shapes. All of the primary structural shapes may be identical. All of the members in all of the primary structural shapes may be identical. All of the axial members may be identical. All of the members in all of the primary structural shapes and all of the axial members may be identical. In some embodiments, the three-dimensional structural frame further includes a hub at each corner of each primary structural shape, and all of the frame members meeting at each respective primary structural shape corner are joined to the respective hub. In some embodiments, at least one hub includes a bent plate having a concave side and including features for connecting the axial frame members meeting at the hub, and a transverse plate fixed transverse to the concave side of the bent plate and transverse to the longitudinal axis of the structural frame, the transverse plate including features for connecting the frame members of the respective primary structural shape meeting at the hub. All of the hubs may be identical. In some embodiments, ends of at least two frame members are formed into flanges, and the two frame members having the flanges are directly joined using the flanges without the use of a separate hub. In some embodiments, the three-dimensional structural frame further includes fasteners joining the flanges of the two frame members, wherein the fasteners are in single shear. In some embodiments, the three-dimensional structural frame further includes fasteners joining the flanges of the two frame members, wherein the fasteners are in double shear. In some embodiments, ends of all of the frame members are formed into flanges, and the connections between frame members are made by directly connecting the respective flanges, without the use of a separate hub.

According to another aspect, a connection at a node of a three-dimensional structural frame includes a bent plate having a concave side and including features for connecting members of the three-dimensional structural frame, and a transverse plate fixed transverse to the concave side of the bent plate and transverse to the axis of a bend in the bent plate, the transverse plate including features for connecting members of the three-dimensional structural frame. The connection further includes at least two frame members connected to the bent plate, and at least two frame members connected to the transverse plate. The transverse plate may be welded to the bent plate. In some embodiments, the bent plate defines holes to which frame members are pinned, riveted, or bolted. In some embodiments, the transverse plate defines holes to which frame members are pinned, riveted, or bolted.

According to another aspect, a connection at a node of a three-dimensional structural frame includes at least two frame members having ends meeting at the connection. Each frame member end meeting at the connection is formed into a flange having connection features, and the flanges are connected to each other without the use of a separate hub. In some embodiments, each flange defines at least one opening, and the flanges are joined using fasteners disposed through the openings, the fasteners being selected from the group consisting of pins, bolts, and rivets. The fasteners may be in double shear. The fasteners may be in single shear.

According to another aspect, a method of assembling a solar collector module includes providing a plurality of frame members, providing one or more hubs, and pre-assembling the plurality of frame members and the one or more hubs to form a subassembly. Each connection of one of the frame members to one of the hubs uses only a single respective fastener that permits relative rotation of the respective frame member and hub about the respective fastener. The method further includes arranging the frame members in a compact configuration that is more compact than an expanded configuration in which the subassembly is to be used in the solar collector module. The compact configuration may be a generally linear configuration. In some embodiments, the method further includes expanding the subassembly into the expanded configuration in which the subassembly is to be used in the solar collector module, and adding additional fasteners holding the frame members to the one or more hubs. The method may further include joining the subassembly with a plurality of similar subassemblies to form a three-dimensional structural frame. The method may further include coupling a reflector to the three-dimensional structural frame to concentrate solar radiation onto a receiver. The plurality of frame members may include at least four axial frame members. In some embodiments, the pre-assembling the plurality of frame members and the one or more hubs to form a subassembly includes, for at least one pair of adjacent axial members in the subassembly, attaching the members of the respective pair to the same hub at one end, and to different hubs at the other end. In some embodiments, the method further includes providing a plurality of folding transverse frame members, attaching the folding transverse frame members, each in a folded configuration, between adjacent hubs, and expanding the subassembly into the configuration in which it is to be used in the solar collector module, while unfolding the folding transverse frame members until each of the folding transverse frame members is substantially straight.

According to another aspect, a subassembly for inclusion in a three-dimensional structural frame of a solar collector module includes a plurality of frame members and one or more hubs. The plurality of frame members and the one or more hubs are interconnected, and each connection of one of the frame members to one of the hubs uses only a single respective fastener that permits relative rotation of the respective frame member and hub about the respective fastener. The subassembly is arranged in a compact configuration that is more compact than an expanded configuration in which the subassembly is to be used in the solar collector module. The compact configuration may be a generally linear configuration. In some embodiments, the subassembly includes at least four axial members, and for at least one pair of adjacent axial members, the members of the respective pair are attached to the same hub at one end, and to different hubs at the other end.

Other features and advantages of the present invention should be apparent from the following description of the preferred embodiments, which illustrate, by way of example, the principles of the invention.

BRIEF DESCRIPTION OF THE DRAWINGS

FIGS. 3A-3E illustrate elements of the three-dimensional structural frame of FIG. 2 in more detail.

DETAILED DESCRIPTION

Figure 1:
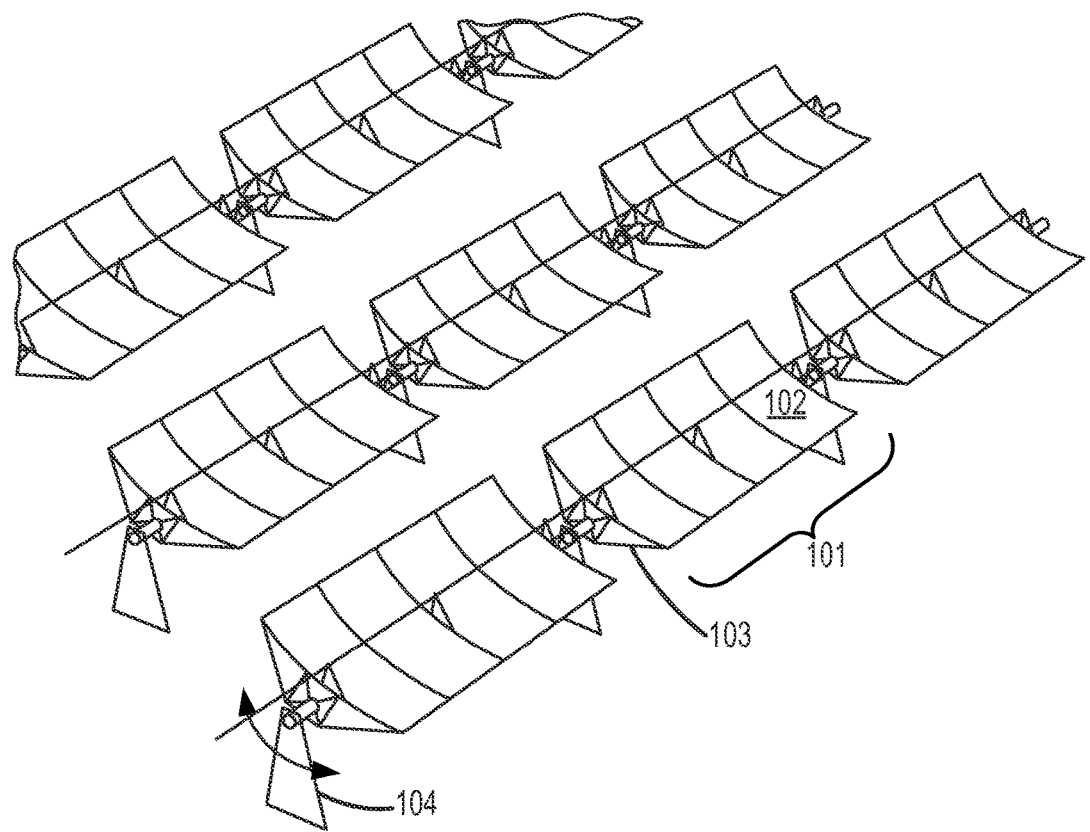
FIG. 1 depicts a schematic view of a portion of a concentrating solar power plant.
Figure 2:
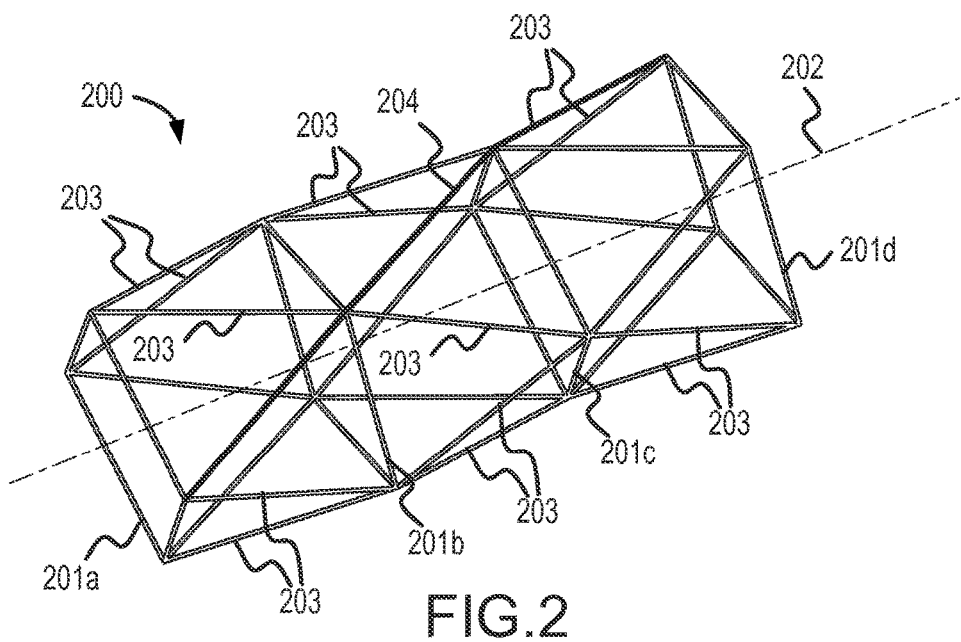
FIG. 2 illustrates an oblique view of a three-dimensional structural frame according to embodiments of the invention.

FIG. 2 illustrates an oblique view of a three-dimensional structural frame 200 according to embodiments of the invention. The frame 200 utilizes frame members interconnected in an arrangement that gives the frame good torsional strength and stiffness as well as strength and stiffness in bending, while utilizing material efficiently.

For the purposes of this disclosure, a frame member is an elongate structural element connected between two nodes of the frame. Each member is preferably substantially rigid, and sized to withstand expected compression and tension loads without yielding or buckling. Each frame member may also be sized so that it resists axial elongation or compression such that the overall three-dimensional structural frame can meet its performance goals for torsional and bending stiffness. In some embodiments, frame members may also withstand bending loads. Frame members may be interconnected at nodes of the frame using devices called hubs or node connectors. The frame members may be made of any suitable material, for example steel, aluminum, other metals, metal alloys, or composite materials. The frame members may be tubular, for example of round or rectangular cross sectional shape, may be made of shapes such as angles, C-sections, or I-sections, or may be of other shapes. The frame members may be monolithic, or may be fabricated, for example including connector elements that facilitate the transitions between frame members and hubs.

The three-dimensional structural frame 200 includes a set of primary structural shapes 201a-201d spaced apart along a longitudinal axis 202 of the structural frame 200. In the example of FIG. 2, each primary structural shape 201a-201d includes four frame members arranged in a square, although in other embodiments, the primary structural shapes may be of other polygonal shapes. For example, the primary structural shapes 201a-201d may be triangular, may have five sides, or another number of sides. In some embodiments, the polygonal shapes are identical regular polygons, although in other embodiments, the primary structural shapes may not all be identical, and may not be regular polygons.

The number of primary structural shapes may also be varied, according to need. While four primary structural shapes 201a-201d are shown in the three-dimensional structural frame 200, more or fewer primary structural shapes may be utilized.

In the exemplary three-dimensional structural frame 200, each of the primary structural shapes 201a-201d is rotated about the longitudinal axis 202 by 45 degrees with respect to the axially adjacent primary structural shapes. Other rotational angles may be used. Axial frame members 203 (only some of which are numbered in FIG. 2) join corners of the primary structural shapes 201a-201d. For example, from each corner of the primary structural shape 201a, two axial frame members 203 extend to the two nearest corners of the primary structural shape 201b. Similarly, from each corner of the structural shape 201b, two axial frame members 203 extend to the two nearest corners of the primary structural shape 201c, and so forth. The axial frame members 203 thus form eight helical torque transfer paths along the length of the three-dimensional structural frame 200. One of the helical paths 204 is highlighted in FIG. 2. Half of the helical paths formed by the axial frame members 203 proceed with right-hand curvature, and half proceed with left-hand curvature. The combined helical paths form a very efficient structure for transmitting torque from one end of the three-dimensional structural frame 200 to the other. The frame members of the primary structural shapes 201a-201d maintain the spacing of the axial frame members 203. The three-dimensional structural frame 200 thus has attributes similar to a tube, which is a very efficient shape for transmitting torque.

Figures 3A, 3B:
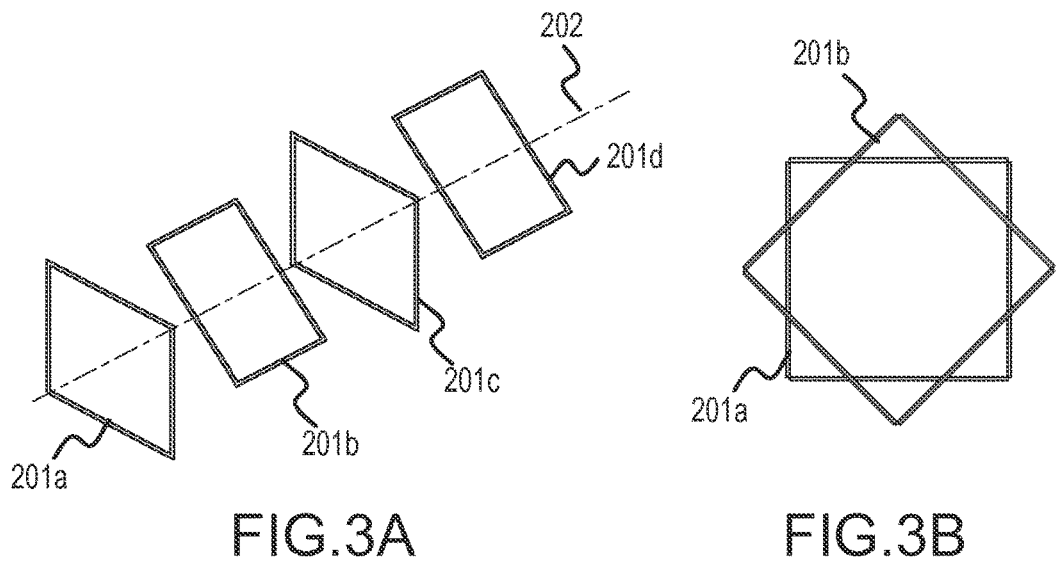

FIGS. 3A-3E illustrate elements of the three-dimensional structural frame 200 in more detail. In FIG. 3A, the primary structural shapes 201a-201d are shown in isolation, spaced apart along the longitudinal axis 202 of the structural frame 200. While the primary structural shapes 201a-201d are shown as being equally spaced, this is not a requirement. FIG. 3B shows an end view of the primary structural shapes 201a and 201b, illustrating that the primary structural shape 201b is rotated with respect to the primary structural shape 201a.

FIG. 3C illustrates two axial frame members 203 extending from one corner of the primary structural shape 201a to the nearest corners of the primary structural shape 201b. FIG. 3D is an end view of the arrangement of FIG. 3C. FIG. 3E illustrates and end view of the exemplary three-dimensional structural frame 200, with all of the axial frame members 203 as illustrated in FIG. 2 in place. (Not all of the axial frame members 203 are labeled in FIG. 3E.)

In some embodiments, the arrangement of the three-dimensional structural frame enables logistical and manufacturing efficiencies. In prior space frame truss designs, many different frame member shapes and sizes may have been used, and different hubs used at different nodes in the space frame. The resulting large number of unique parts resulted in complexity of the frame assembly and in the logistics of part procurement and fabrication. In accordance with some embodiments of the invention, all of the frame members used in the primary structural shapes may be identical, such that the number of unique parts in the three-dimensional structural frame 200 is reduced as compared with a traditional space frame truss. In addition, all of the axial frame members 203 may be identical to each other. In some embodiments, all of the frame members, including both the axial frame members and the frame members utilized in the primary structural shapes are identical, such that only one frame member configuration is used throughout the three-dimensional structural frame. In some embodiments, all of the hubs utilized throughout the three-dimensional structural frame are identical as well.

Figure 4A:
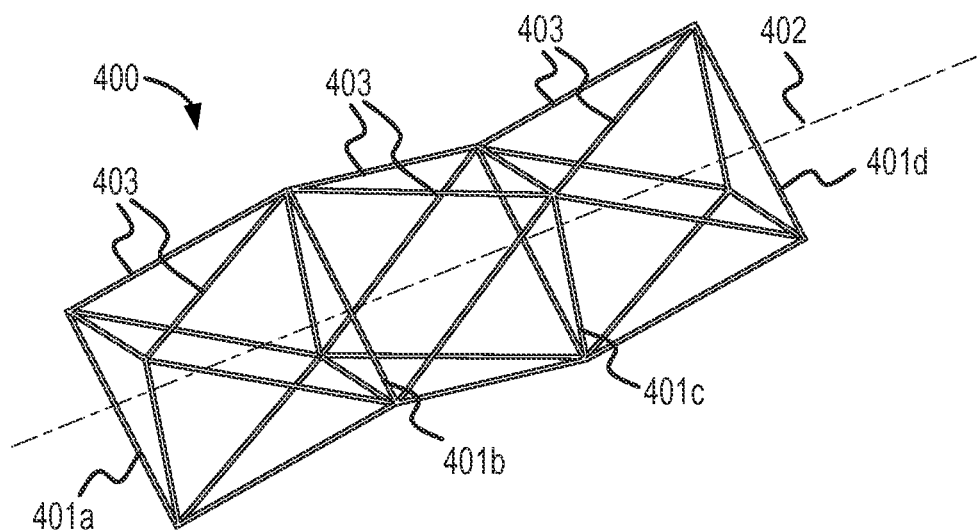
FIGS. 4A and 4B illustrate oblique and end views of a three-dimensional structural frame in accordance with other embodiments.
Figure 4B:
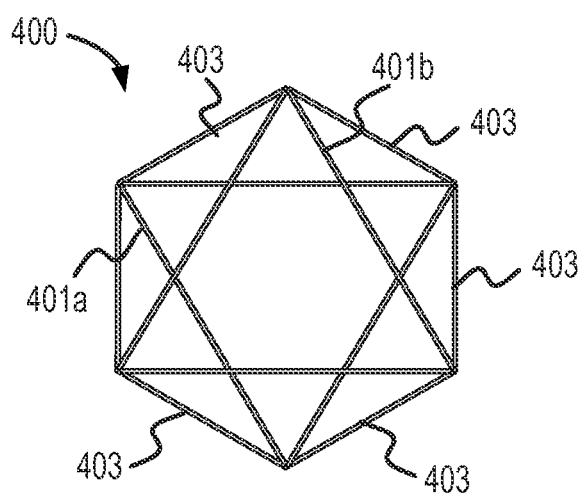

FIGS. 4A and 4B illustrate oblique and end views of a three-dimensional structural frame 400, in accordance with other embodiments. The three-dimensional structural frame 400 utilizes triangular primary structural shapes 401a-401d, spaced apart along a longitudinal axis 402. Axial frame members 403 form six helical paths along the frame for the transmission of torque. Primary structural shapes having other numbers of members may also be used.

Figure 5A:
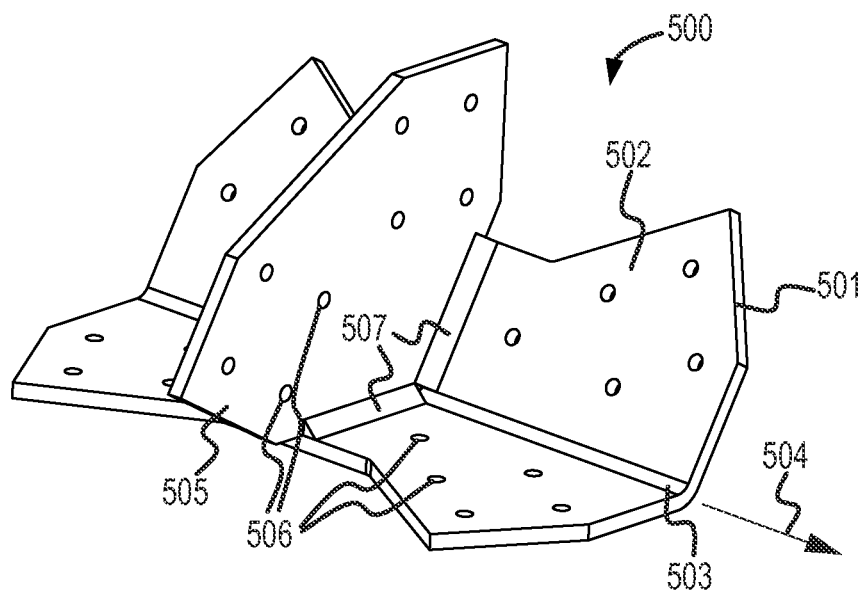
FIGS. 5A and 5B illustrate a hub or node connector in accordance with embodiments.
Figure 5B:
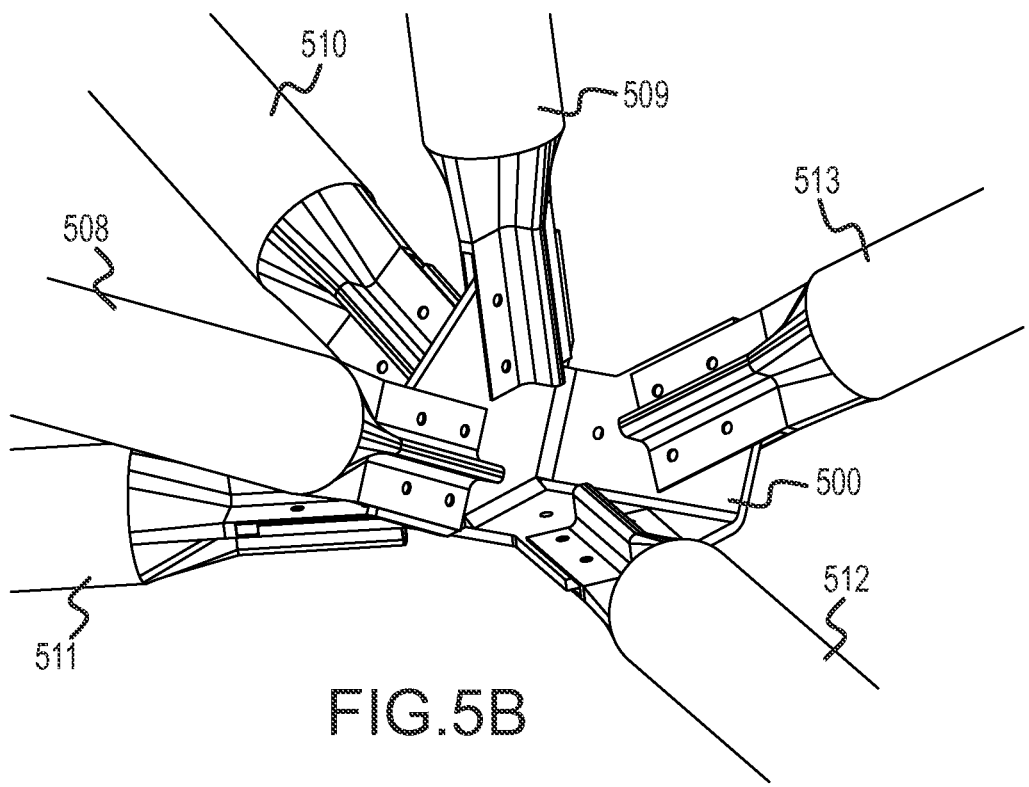

FIGS. 5A and 5B illustrate a hub or node connector 500 in accordance with embodiments, which may be used for interconnecting members of a three-dimensional structural frame such as the frame 400. The exemplary hub 500 includes a bent plate 501 having a concave side 502. The bent plate 501 is bent along a bend 503, which has an axis 504. A transverse plate 505 is fixed to the concave side 502 of the bent plate 501, transverse to the axis 504 of the bend 503. Both the bent plate 502 and the transverse plate 505 include features for connecting frame members. In exemplary hub 500, the plates define holes 506 (only some of which are labeled), which may be used for connecting frame members, for example using pins, rivets, or bolts. Other kinds of connection features and methods may also be envisioned. The transverse plate 505 may be fixed to the bent plate 501 by any suitable means, for example by welding along weld lines 507.

FIG. 5B illustrates the connections of six frame members 508-513 to the hub 500. The frame members 508 and 509 may be members of a primary structural shape, for example the primary structural shape 401b of the three-dimensional structural frame 400. The frame members 510, 511, 512, and 513 are axial frame members, such as some of the axial members 403 of the three-dimensional structural frame 400. Although no fasteners are shown in FIG. 5B, the frame members 508-513 may be pinned, riveted, bolted, or otherwise fastened to the hub 500. The exemplary hub 500 may be especially suited to a three-dimensional structural frame having triangular primary structural shapes, but similar hubs may be constructed for frames having primary structural shapes with other numbers of members. In some embodiments, all of the hubs in the frame are identical, but this is not a requirement.

A three-dimensional structural frame as described above is especially well suited to use in a concentrating solar collector module. Each module of a concentrating solar collector may be required to withstand and transmit significant torques with limited torsional deflection in order to maintain the alignment of modules in a solar collector assembly, and may also be required to resist bending in order to maintain proper focus of reflected solar radiation onto a receiver tube.

Figure 6A:
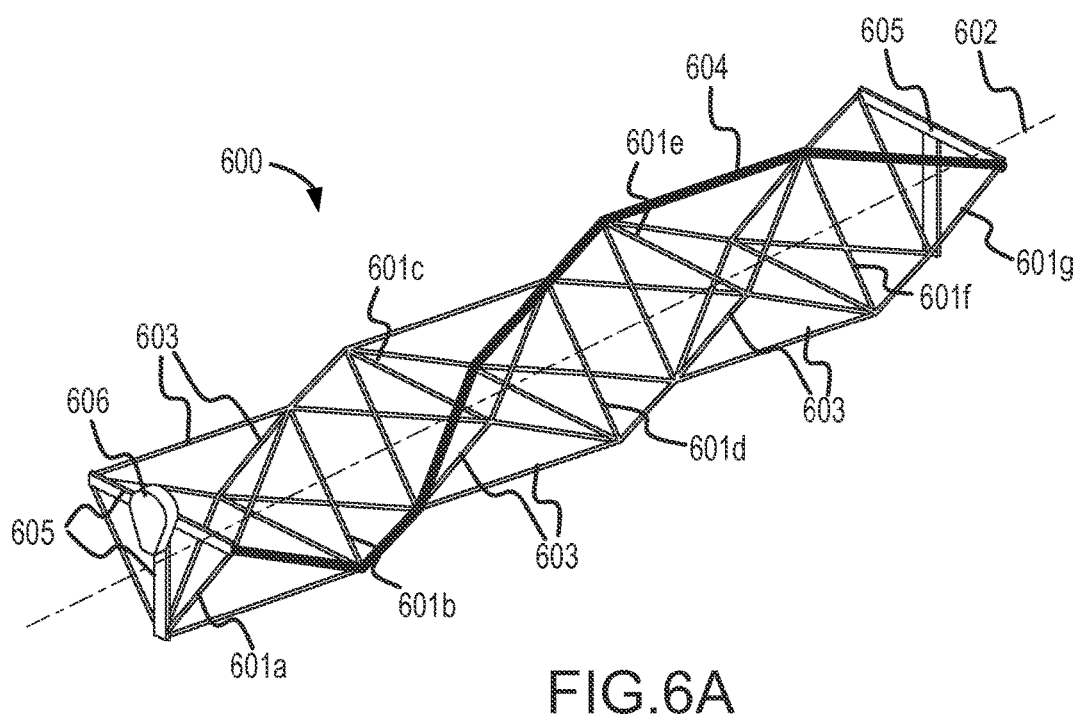
FIGS. 6A-6E illustrate the use of a three-dimensional structural frame in a solar collector module, in accordance with embodiments.

FIGS. 6A-6E illustrate the use of a three-dimensional structural frame 600 in a solar collector module, in accordance with embodiments. In this example, as shown in FIG. 6A, the three-dimensional structural frame 600 utilizes seven primary structural shapes 601a-601g, each of which is triangular. The primary structural shapes 601a-601g are spaced apart along a longitudinal axis 602 of the three-dimensional structural frame 600, and are connected by axial frame members 603, only a few of which are labeled in FIG. 6A. One of the six helical torque transfer paths 604 formed by the axial frame members 603 is highlighted in FIG. 6A. Additional bracing 605 may be provided at each end of the three-dimensional structural frame 600, to mount the structural frame 600 to bearings 606 and to assist in transferring torque between adjacent modules. The bearings 606 enable the module to rotate about an axis to track the sun. The rotational axis defined by the bearings 606 need not be the same as the longitudinal axis of the three-dimensional structural frame 600, but may be placed near a center of mass of the completed solar collector module.

Figure 6B:
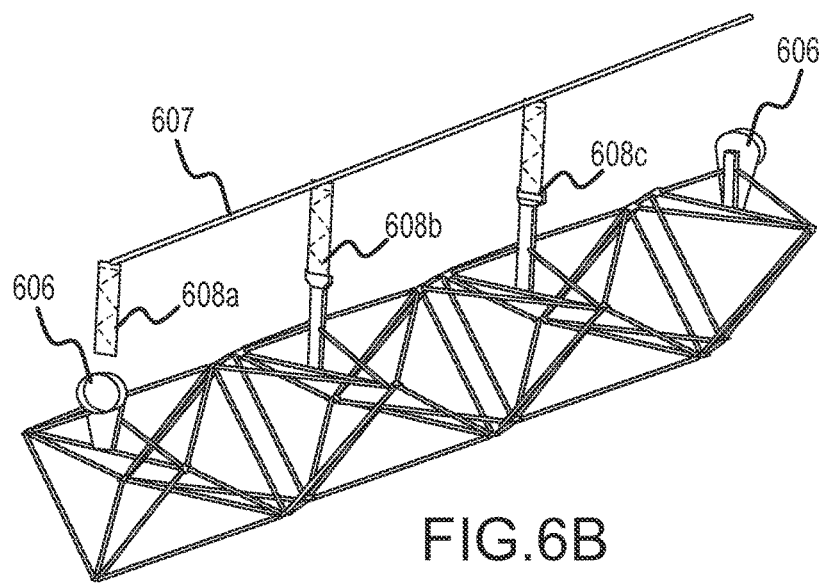

FIG. 6B illustrates the three-dimensional structural frame 600 with additional elements of a solar collector module in position. A receiver tube 607 is supported by receiver supports 608a-608c, which are in turn attached to the three-dimensional structural frame 600, for example at the primary structural shapes 601. The receiver tube 607 is preferably positioned at or near a focal line of a reflector, and receives concentrated solar radiation reflected from the reflector.

Figure 6C:
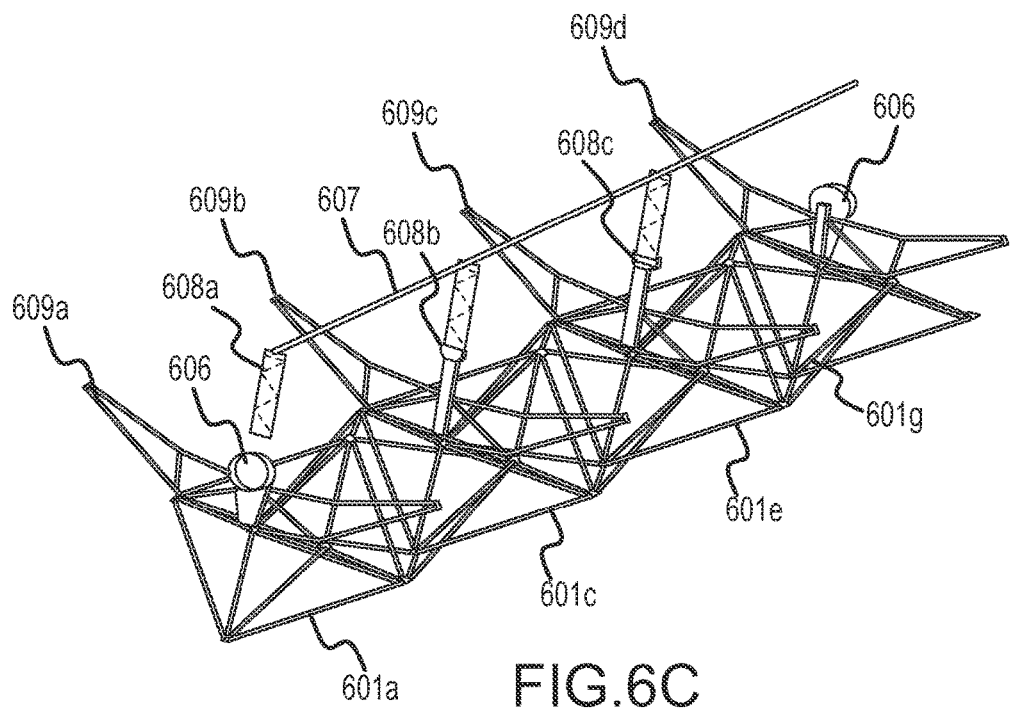

FIG. 6C illustrates the three-dimensional structural frame 600 with the receiver tube and receiver supports as shown in FIG. 6B and also with four reflector support structures 609a-609d added. In this example, four reflector support structures are used, coinciding with alternate (every other) primary structural shapes 601a, 601c, 601e, and 601g. The reflector support structures 609a-609d may be separately assembled, and then attached to the three dimensional structural frame 600. This modular form of construction of the solar collector module may more effectively separate the mirror support function of the module from the torque transmission function of the module, as compared with traditional space frame designs, and thus may facilitate product development and refinement, as design changes may be made to either the structural frame 600 or to the reflector support structures 609a-609d without affecting the other, so long as the connections between the structural frame 600 and the reflector support structures 609a-609d remain in their fixed positions.

Figure 6D:
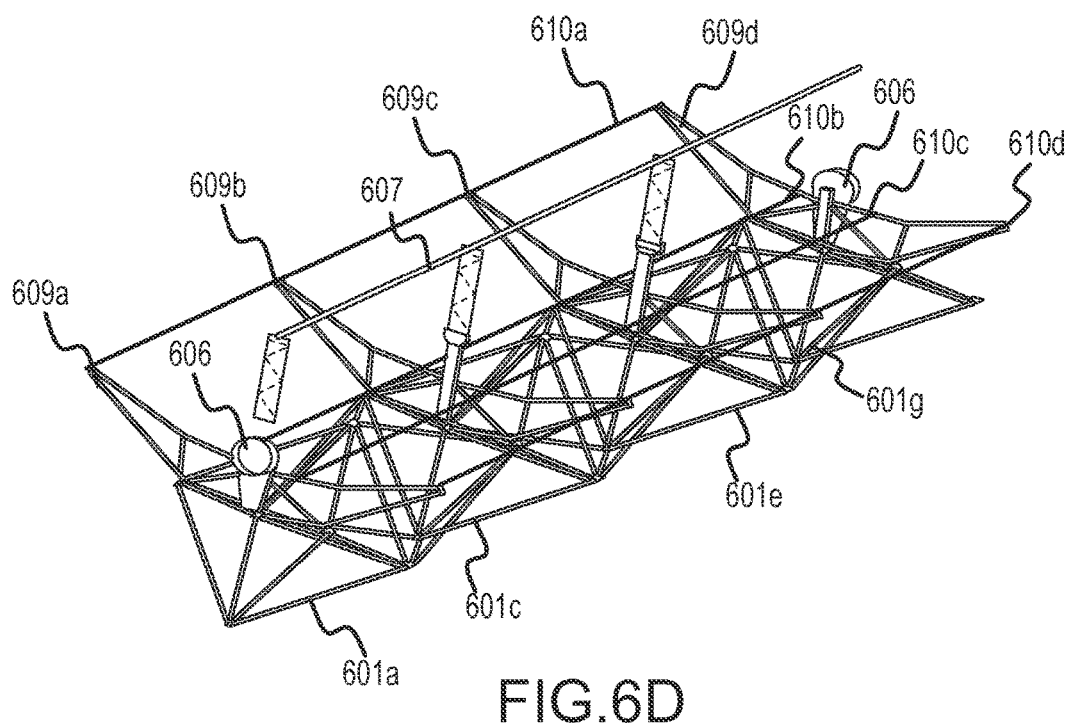

FIG. 6D shows the addition of purlins 610a-610d to the reflector support structures 609a-609d. The purlins may facilitate the mounting of a reflector to the module.

Figure 6E:
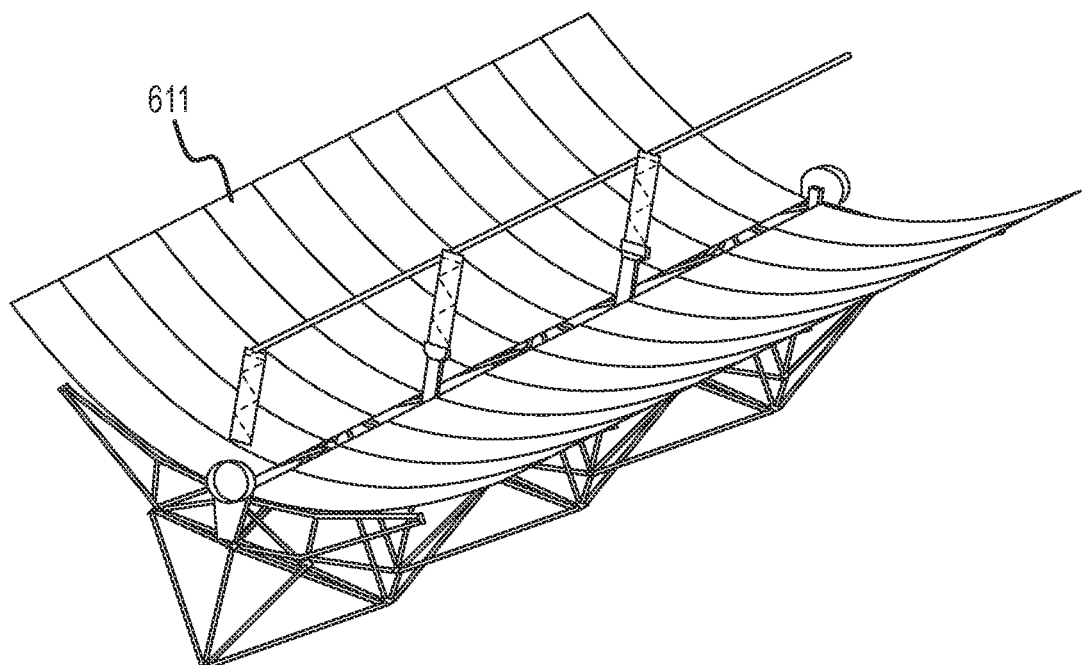

FIG. 6E illustrates the addition of a reflector 611 to the solar collector module. The reflector 611 is coupled to the three-dimensional structural frame 600 by the purlins 610a-610d and the reflector support structures 609a-609d. The reflector 611 is shaped to concentrate solar radiation onto the receiver tube 607. The reflector 611 may comprise segments that collectively form the reflector 611, for example composite mirror panels. An example composite mirror panel may include a structural component such as a polyisocyanurate foam, polypropylene honeycomb, or other structural component sandwiched between outer sheets made of metal, fiberglass, or another suitable material, with a reflective surface applied to one side of the panel. Other techniques and materials may be employed in constructing composite panels. In some embodiments, each composite mirror panel may be supported at only two spaced-apart locations, for example at purlins 610a and 610b, or at purlins 610c and 610d. The composite mirror panels may be cantilevered beyond the edges of the three-dimensional structural frame, as shown in FIG. 6E.

FIGS. 7A-7D illustrate another technique for making connections between frame members at nodes of the structural frame. The technique of FIGS. 7A-7D does not require the use of hubs or node connectors, and thus may significantly reduce the number of parts required to construct the structural frame.

Figure 7A:
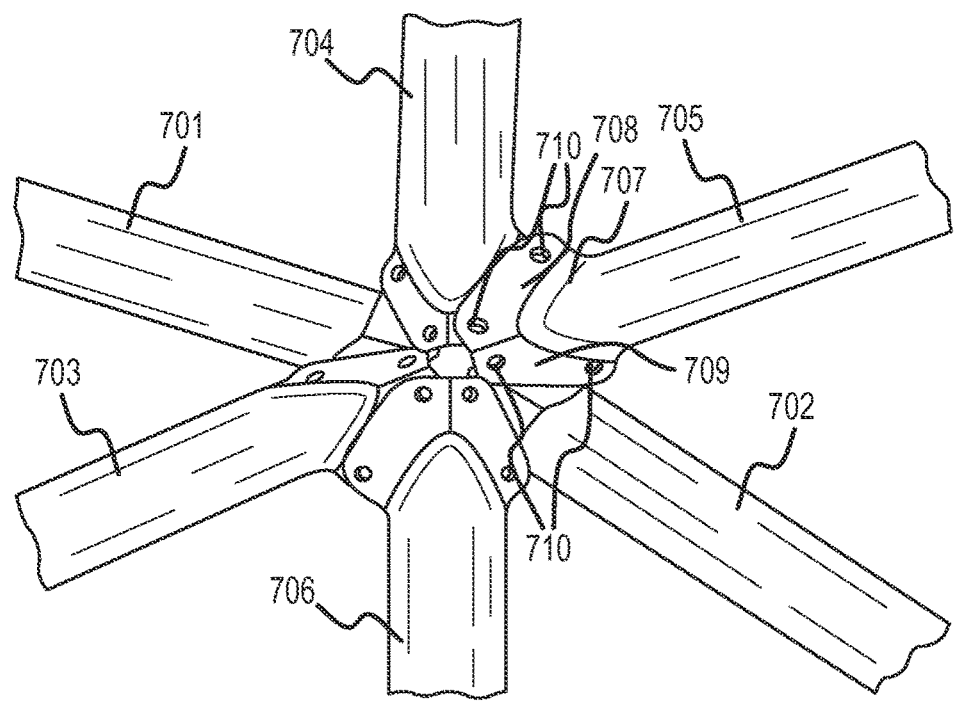
FIGS. 7A-7D illustrate a technique for making connections between frame members at nodes of the structural frame, in accordance with embodiments.

In FIG. 7A, frame members 701 and 702 are members of one of the primary structural shapes of the frame, and other frame members 703-706 are axial frame members. The end of each of the frame members 701-706 meeting at the pictured node is formed, for example by pressing or stamping, into a flange. For example, the end of the axial frame member 705 has been pressed to form a flange 707. In this example, the flange 707 includes two flat portions 708 and 709, angled with respect to each other to facilitate joining the flange 707 with similar flanges on other frame members. Each of the faces 708 and 709 defines a pair of openings 710, positioned to mate with similar openings in flanges on other frame members when the frame is properly assembled. For example, the frame members may be joined using pins, bolts, rivets, or other fasteners through the openings 710. (The fasteners are not shown in FIG. 7A.) Other methods of joining the frame members may also be envisioned, for example direct welding.

Figure 7B:
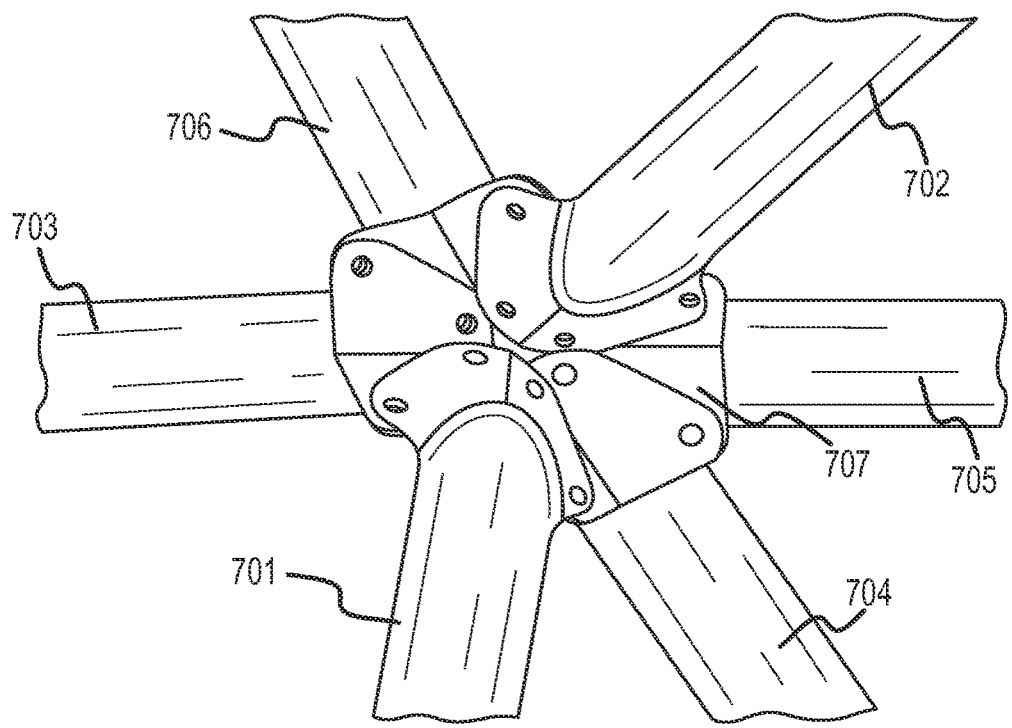
Figure 7C:
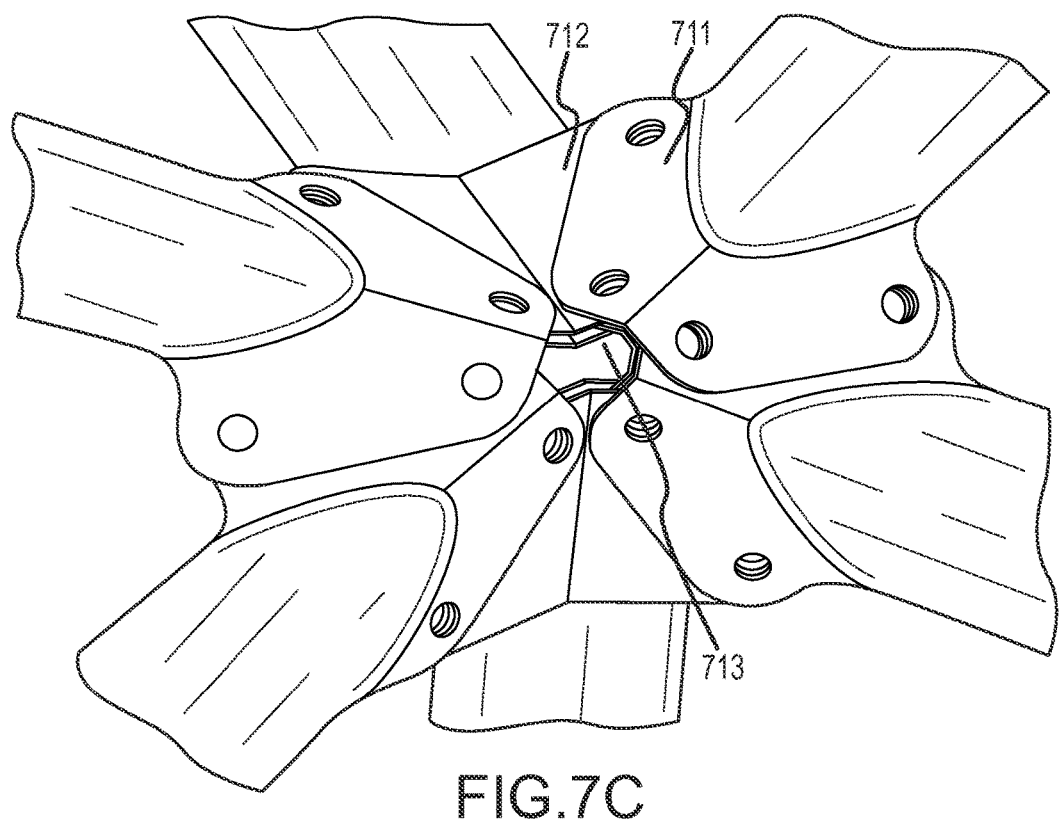
Figure 7D:
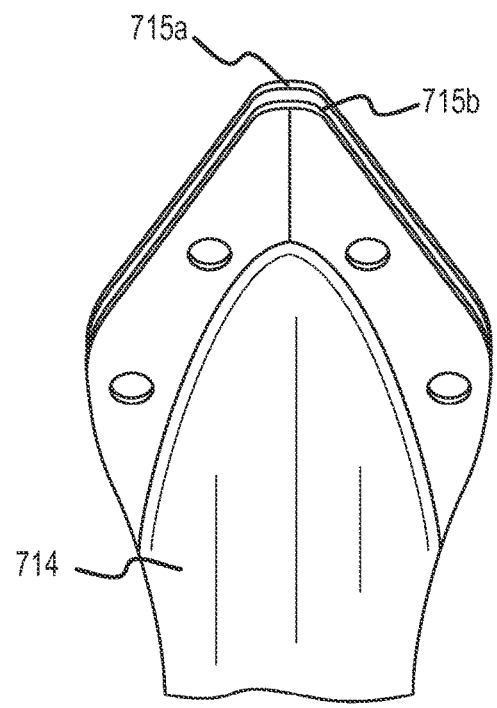

FIG. 7B illustrates the node of FIG. 7A, from a reverse angle. The flanges of the exemplary frame members 701-706 are placed adjacent each other and are connected with any pins, bolts, or rivets in single shear. FIG. 7C illustrates another example embodiment, in which the ends of the frame members are formed into flanges having two spaced-apart portions. A portion of a flange of one frame member fits between the portions of another frame member flange, so that the pins, bolt, or rivets joining the two members are placed in double shear. For example, as can be seen in FIG. 7C, a portion of flange 711 of one frame member fits between the portions of a flange 712 from another frame member, and vice versa, at location 713. This arrangement may result in a stronger joint. FIG. 7D illustrates another example of a frame member having a flange 714 that includes two spaced-apart portions 715a and 715b.

In other embodiments, a composite reflector is provided. The reflector may be for a concentrating solar power (CSP) system, in which the reflector may redirect to, and concentrate solar power at, a receiver. The reflector may be the entirety of, a merely a sub-portion of, any one particular reflector in the system.

Figure 8:
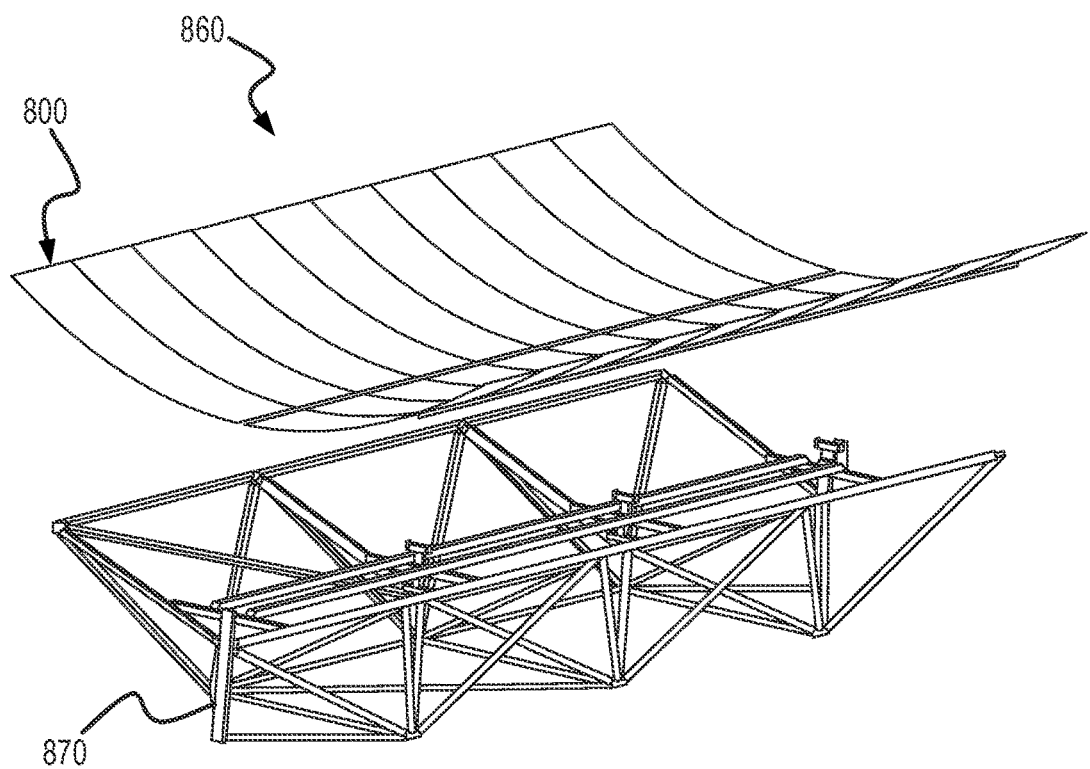
FIG. 8 shows an oblique view of a reflector in accordance with embodiments, made from reflector panels that are concave along their length.

In embodiments where the reflector is a sub-portion of one reflector in the CSP, the reflector may be concave along its length. In this manner, such reflectors can create a larger overall reflector when disposed side-by-side. Another set of side-by-side reflectors may be disposed above or below such a set to create an even larger overall reflector. FIG. 8 illustrates an oblique view of a reflector 860 according to embodiment, wherein the reflector is made up of reflector panels 800 that are concave along their length.

Figure 9:
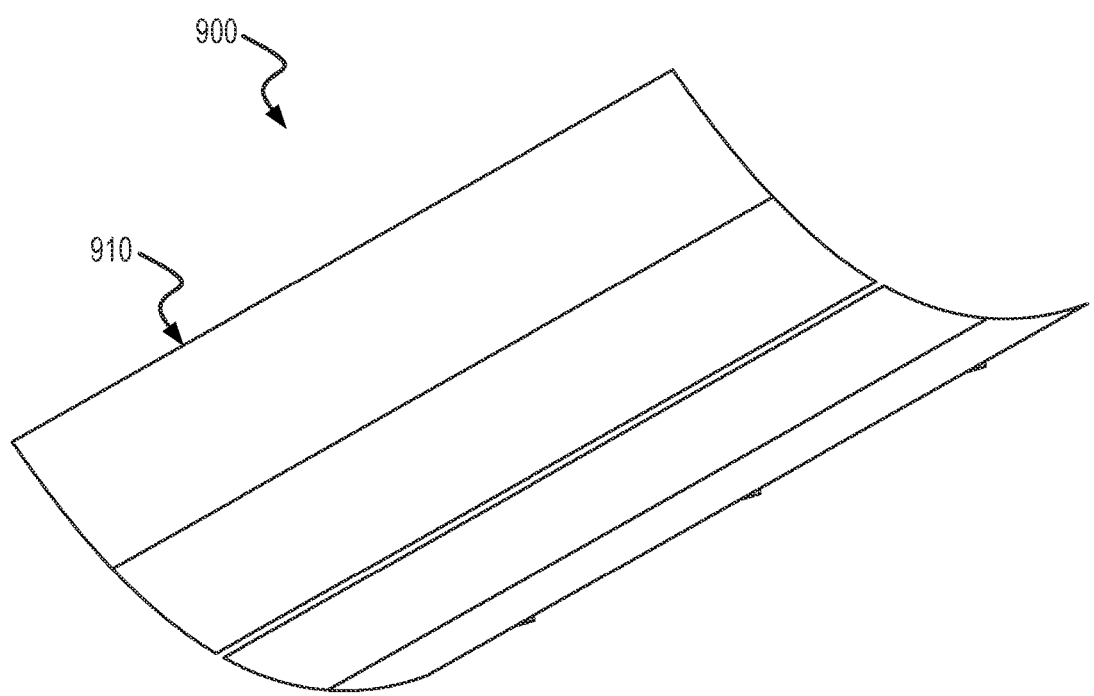
FIG. 9 shows an oblique view of a reflector in accordance with embodiments, made from reflector panels that are concave along their width.

In other embodiments where the reflector is a sub-portion of one reflector in the CSP, the reflector may be concave along its width. In this manner, such reflectors, when disposed side by side, can create a larger overall reflector. FIG. 9 illustrates an oblique view of a reflector 900 according to embodiment, wherein the reflector is made up of reflector panels 910 that are concave along their length.

A structural frame according to embodiments of the invention, for example a structural frame as illustrated in FIG. 2, FIG. 4A, or FIG. 6A, may facilitate certain production and assembly efficiencies. Some of these will be explained below in the context of the three-dimensional structural frame 600, which, for ease of reference, is once again illustrated in FIG. 10. The three-dimensional structural frame 600 includes seven primary structural shapes 601a-601g, each of which is triangular. The primary structural shapes 601a-601g are spaced apart along a longitudinal axis 602 of the three-dimensional structural frame 600, and are connected by axial frame members 603, only a few of which are labeled in FIG. 6A.

The three-dimensional structural frame 600 may be thought of as including six "bays" 1001a-1001f, each bay extending from one of the primary structural shapes 601a-601g to the next. Referring to the bays 1001c and 1001d, these bays are formed in part by the axial frame members 603 that extend from the three corners of triangular primary structural shape 601d. For example, the top portions of the bays 1001c and 1001d is formed by the four axial frame members labeled collectively as 1002, which meet at node 1003. The rest of the exterior of bays 1001c and 1001d is formed by the four axial frame members that meet at node 1004 and the four axial frame members that meet at node 1005, for a total of 12 axial frame members. (When primary structural shapes other than triangles are used, more axial frame members will be needed to define a bay. For example, when the primary structural shapes are square, then 16 axial frame members will be needed to define the exterior of two adjacent bays.)

In some embodiments, the three-dimensional structural frame 600 is designed such that all of the axial frame members 603 are identical to each other, and such that the hubs or node connectors at all of the nodes (possibly excepting nodes at the ends of the three-dimensional structural frame 600) are identical to each other. Additionally, all of the frame members making up the primary structural shapes 601b-601f (and possibly some of the members making up primary structural shapes 601a and 601g) may be identical to each other. Thus, the three-dimensional structural frame 600 may include forty-two identical axial frame members 603, nineteen identical frame members used to make up the primary structural shapes 601, and fifteen identical node connectors at the corners of the primary structural shapes 601b-601f, so that the bulk of the three-dimensional structural frame 600 is made up of only three unique part types and the fasteners used to connect them. In an embodiment where the axial frame members 603 and the members of the primary structural shapes 601a-601g are identical to each other, the bulk of the three-dimensional structural frame 600 may be made up of sixty-one identical frame members and fifteen identical hubs.

In one aspect, the fact that many parts of the three-dimensional structural frame 600 are identical means that in a large installation where many collector modules are used, the individual structural members used to assemble the three-dimensional structural frames of the modules can be manufactured in very high volumes, leading to production efficiencies in the fabrication of the frame members. In addition, the low number of unique parts in the three-dimensional structural frame simplifies inventory control, shipping, and other aspects of parts procurement.

In another aspect, portions of the three-dimensional structural frame 600 may be pre-assembled before shipping to a job site where the eventual collector modules will be installed for use, such as in a concentrating solar power plant. For example, portions of the three-dimensional structural frame 600 may be assembled near the location where the individual frame members and node connectors are fabricated, or at an intermediate location. The pre-assembly of portions of the three-dimensional structural frames may be performed indoors, so that at least some of the module assembly is not likely to be hindered by adverse weather. The pre-assembly enables material to be shipped to the eventual job site in larger subassemblies than if the individual members were shipped separately, simplifying material handling and reducing the risk of lost or misplaced parts at the job site, which is likely outdoors.

Figure 10:
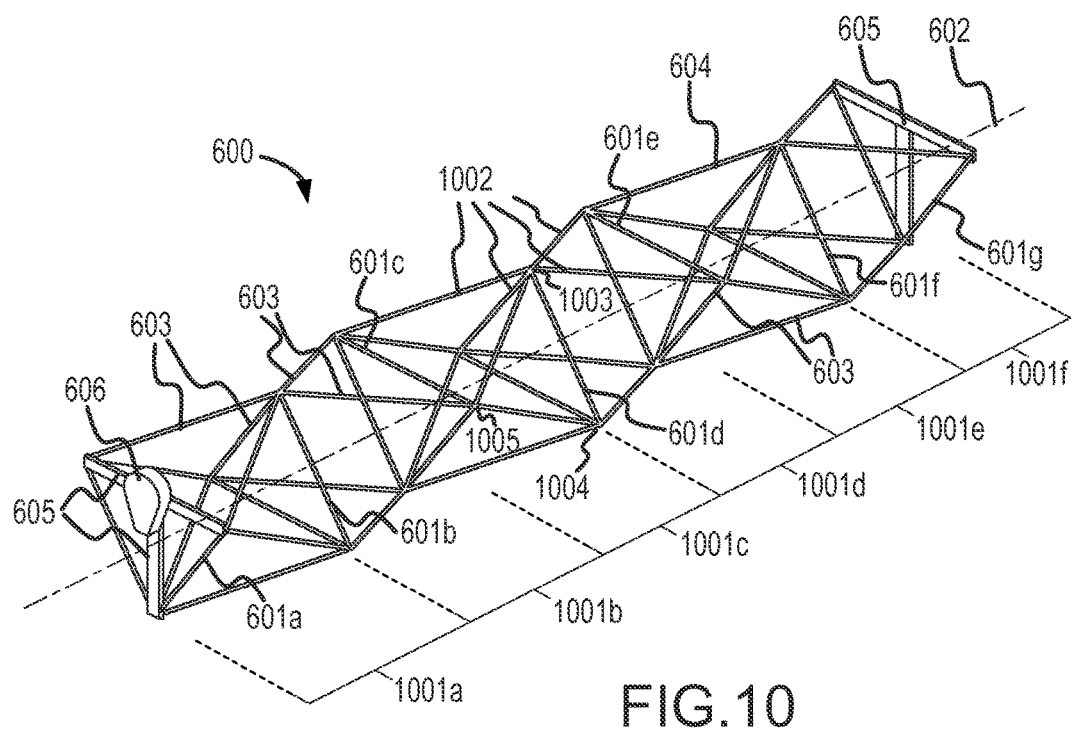
FIG. 10 shows the three-dimensional structural frame of FIG. 6A, with added annotation.
Figure 11A:
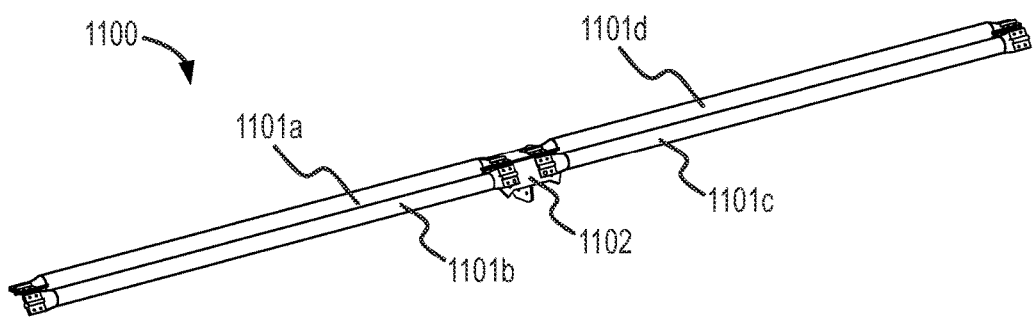
FIGS. 11A-11C illustrate a subassembly in accordance with embodiments of the invention.
Figure 11B:
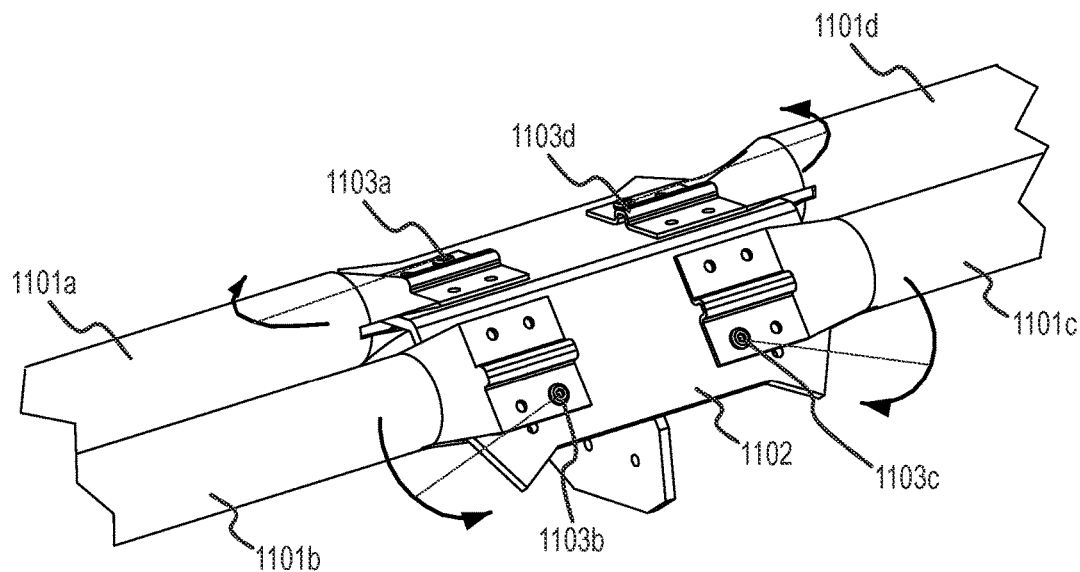

In one pre-assembly technique, sets of four or more axial frame members 603, for example the set labeled collectively as 1002 in FIG. 10, may be partially pre-assembled to their common node connector. FIG. 11A shows four axial frame members, labeled 1101a-1101d, assembled to a hub 1102, which is similar to the hub 500 shown in FIG. 5A. The pre-assembled frame members 1101a-1101d and the hub 1102 form a subassembly 1100. FIG. 11B shows an enlarged view of the area of FIG. 11A including the hub 1102 and the connections of the axial frame members 1101a-1101d to the hub 1102. In the subassembly 1100, each of the axial frame members 1101a-1101d is attached to the hub 1102 using a single respective rivet or other suitable fastener 1103a-1103d. Preferably, the subassembly 1100 is arranged in a compact shipping configuration for shipping to the job site. In the shipping configuration, the members included in the subassembly 1100 are more compactly arranged than in the completed three-dimensional structural frame. For example, in the arrangement of FIG. 11A, the axial frame members 1101a-1101d are arranged in a generally linear configuration.

Figure 11C:
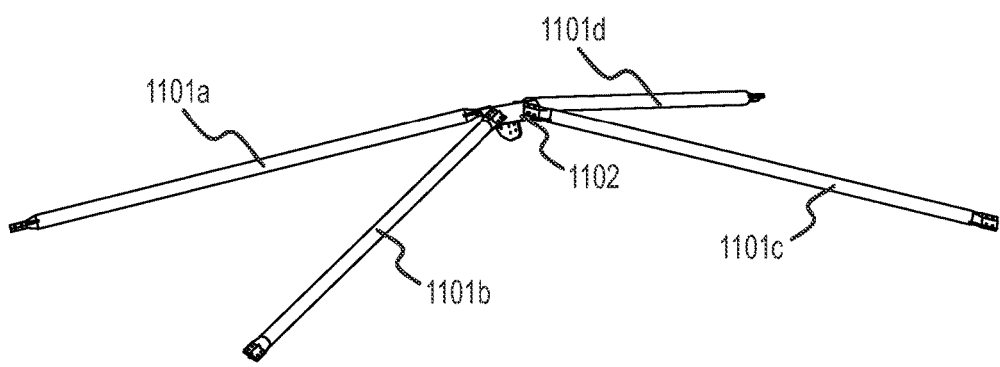

With the application of moderate torque, the axial frame members 1101a-1101d can rotate around the respective rivets 1103a-1103d so that the subassembly 1100 can be expanded to the configuration in which it will used in the three-dimensional structural frame 600, as shown in FIG. 11C. Rivets or other fasteners can then be placed in the other holes in the ends of the axial frame members 1101a-1101d, adding strength and rigidity to the subassembly.

Once the pre-assembled subassemblies have been expanded, they can be joined together at the job site using additional hubs and rivets or other fasteners, and the frame members forming the primary structural shapes 601b-601f can be attached. Any unique end members can be attached, to complete the three-dimensional structural frame, and a reflector may be coupled to the three-dimensional structural frame to complete a solar collector module.

While the subassembly 1100 includes only four axial frame members connected to one hub to form a subassembly about twice the length of the axial frame members 1101a-1101d, larger or smaller subassemblies may be used. For example, only one or two axial frame members could be connected to a hub to form a subassembly. Or additional hubs and axial frame members may be attached to ends of some or all of the axial frame members 1101a-1101d, to form a longer subassembly, subject only to the practicality of shipping the resulting subassembly.

FIGS. 12A-12D illustrate another example of pre-assembling part of the three-dimensional structural frame 600. In this example, all of the axial frame members needed for two bays of the three-dimensional structural frame 600 are assembled to hubs forming a subassembly 1200. In this example, twelve axial frame members 1201a-1201l are assembled using nine hubs 1202a-1202i. In the subassembly 1200, each adjacent pair of axial frame members is attached to the same hub at one end, and to different hubs at the opposite end. For example, the adjacent axial members 1201a and 1201b are both attached to the hub 1202b at one end, but the axial member 1201a is attached to the hub 1202f at the other end while the axial member 1201b is attached to another hub 1202d. Similarly, the adjacent axial members 1201b and 1201e are both attached to the hub 1202d at one end, but at the other end, the axial member 1201b is attached to the hub 1202b while the axial member 1201e is attached to the hub 1202a.

As in the previous example, only one rivet or other suitable fastener is used at each end of each of the axial frame members 1201a-1201l. This permits the axial frame members and the hubs to undergo relative rotation about the fasteners, to compress the subassembly into the compact, generally-linear arrangement of FIG. 12A, and also to expand the subassembly 1200 as indicated by arrows 1203a-1203c. As the subassembly 1200 is expanded, its ends come closer together, as indicated by arrows 1204a and 1204b.

Figure 12A:
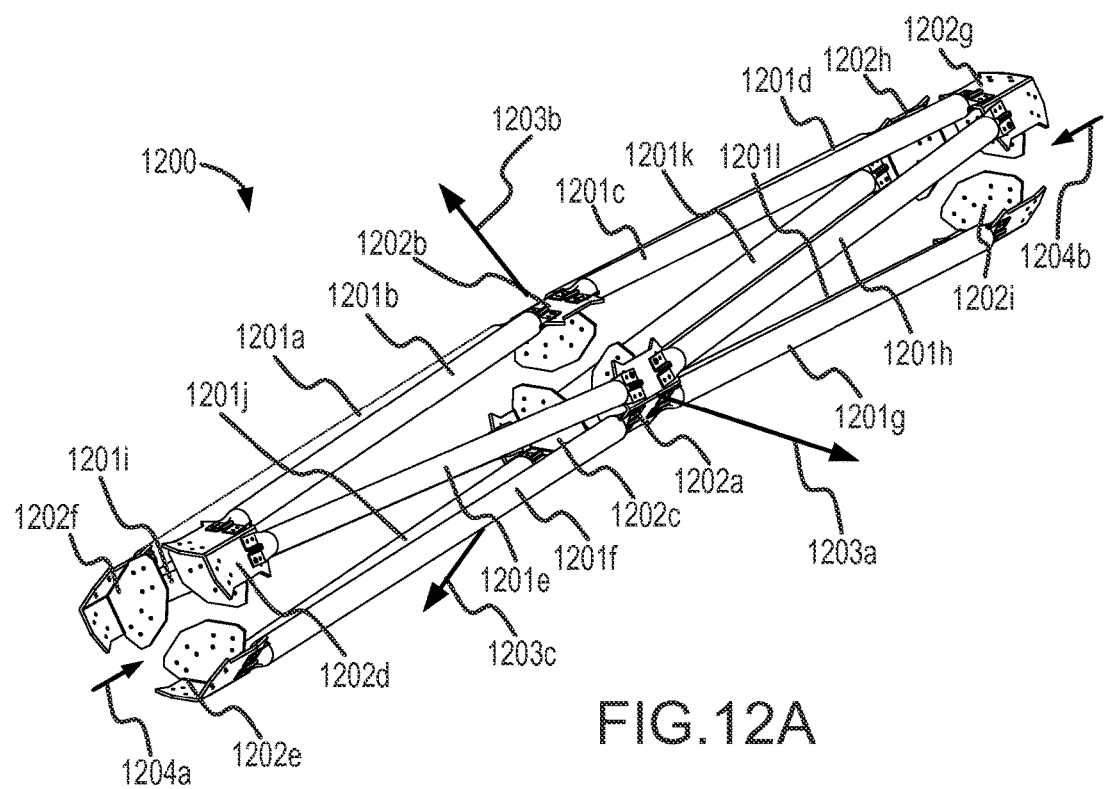
FIGS. 12A-12D illustrate a subassembly in accordance with other embodiments of the invention.
Figure 12B:
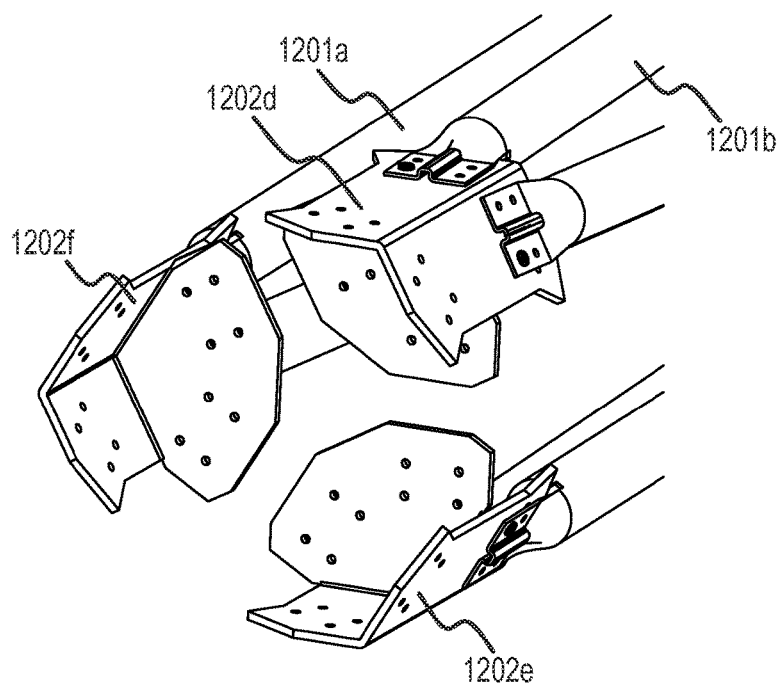

FIG. 12B shows an enlarged view of a portion of FIG. 12A, illustrating single rivets attaching axial frame members to the hubs 1202d-1202f. (Not all of the rivets are visible in FIG. 12B.)

Figure 12C:
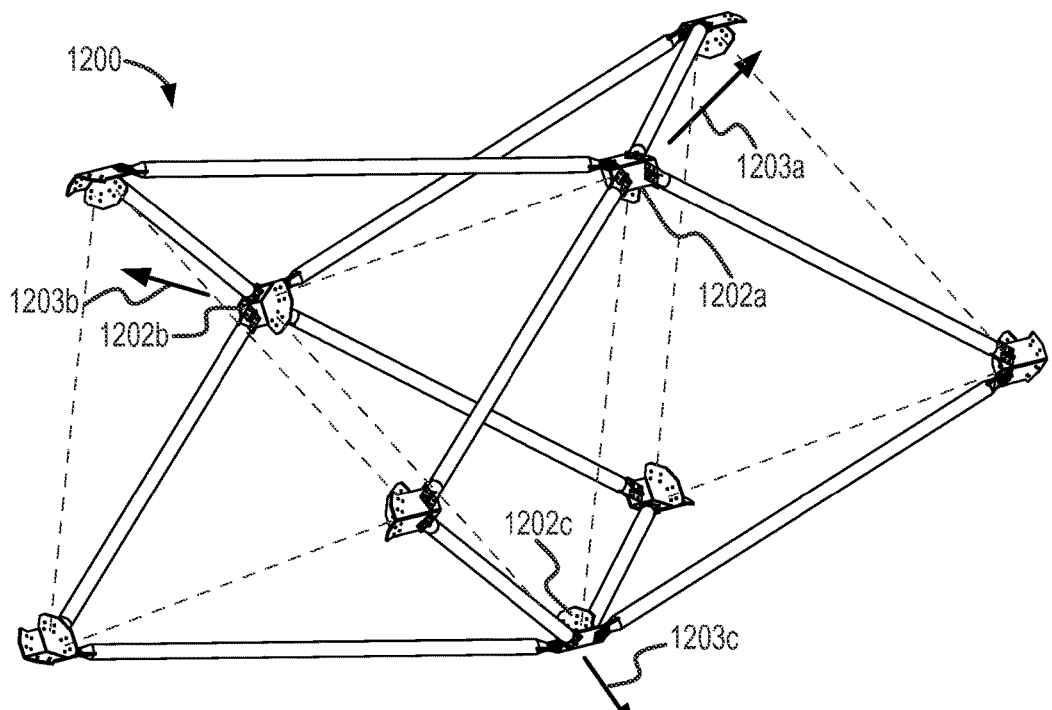
Figure 12D:
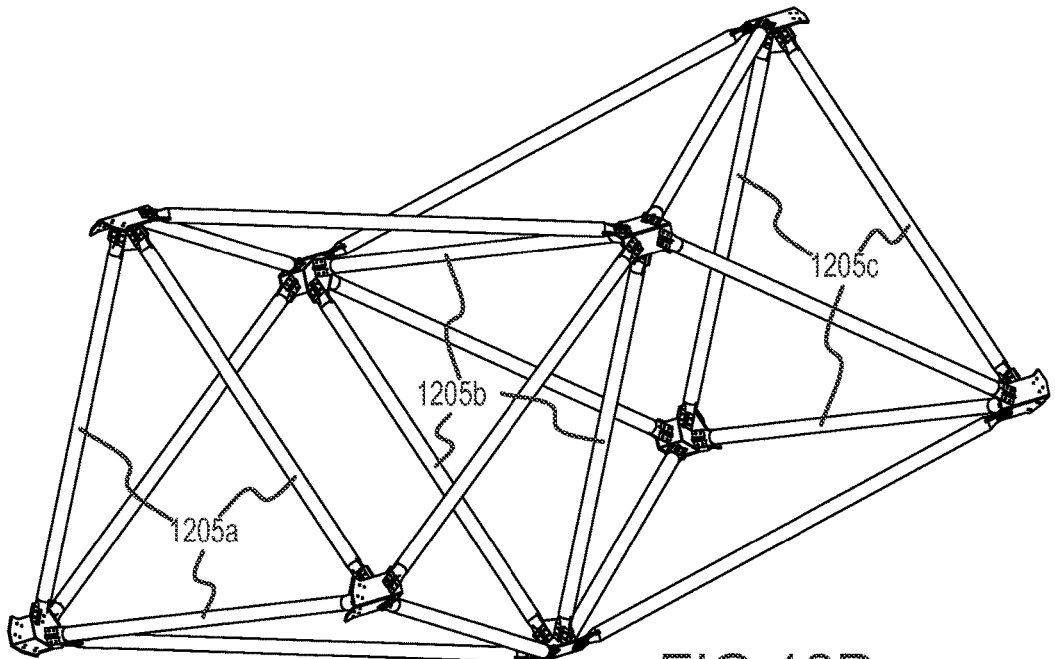

FIG. 12C shows the subassembly 1200 in its fully expanded state, in the configuration in which it is to be used in the eventual three-dimensional structural frame. The dashed lines in FIG. 12C illustrate where the primary structural shapes will be placed to complete the two-bay portion of the three-dimensional structural frame 600. FIG. 12D shows the subassembly 1200 with the primary structural shapes 1205a-1205c in place. Rivets or other fasteners would then be placed in all of the mating holes where the frame members and hubs join.

Multiple similar subassemblies may then be connected together using additional axial frame members, and any unique end members added, to complete the three-dimensional structural frame 600. A reflector may then be attached to the three-dimensional structural frame, to complete a solar collector module as described above.

Figure 13A:
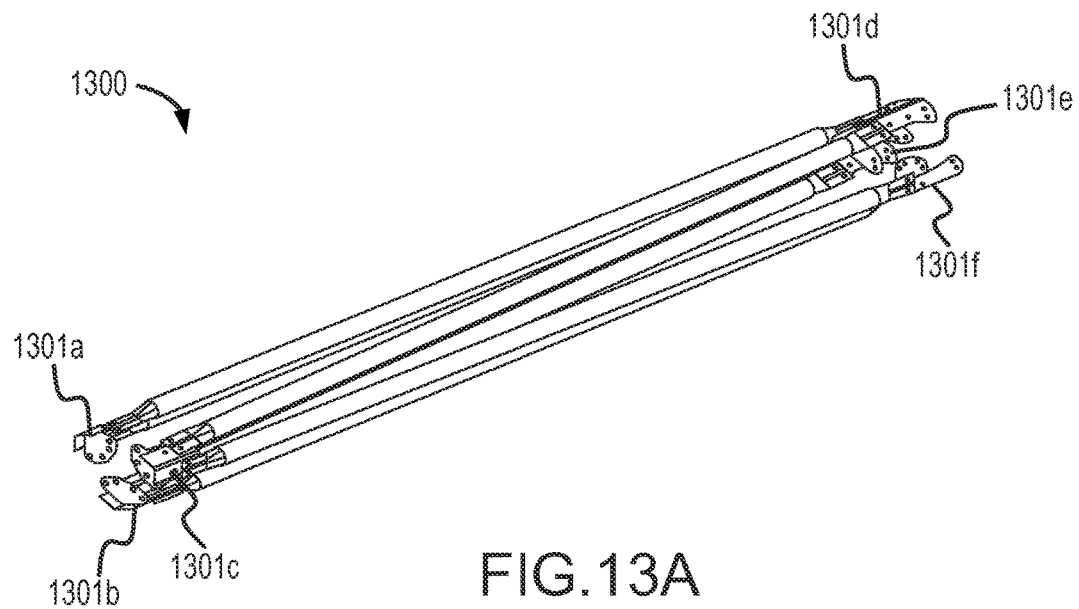
FIGS. 13A-13E illustrate a subassembly in accordance with other embodiments of the invention.
Figure 13B:
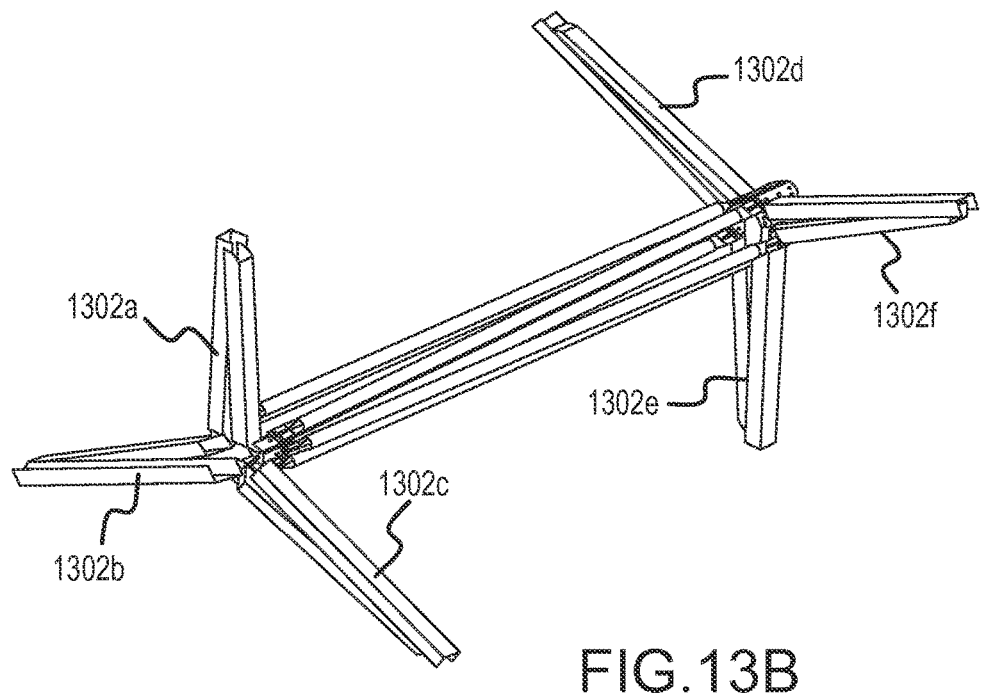

Other sizes of subassemblies may be formed. For example, a subassembly for forming only a single bay of the three-dimensional structural frame 600 could be made by omitting the axial frame members 1201c, 1201d, 1201g, 1201h, 1201k, and 1210l, and hubs 1202g, 1202h, and 1202i from the subassembly 1200. A subassembly 1300 formed in this way is shown in FIG. 13A. In the subassembly 1300, six axial frame members are attached as described above to six hubs 1301a-1301f Expansion and further assembly of such a subassembly may be facilitated by using folding transverse frame members, as shown in FIG. 13B. In FIG. 13B, folding transverse frame members 1302a-1302f have been connected between adjacent hubs. Each of the folding transverse frame members includes two portions hinged together.

Figure 13C:
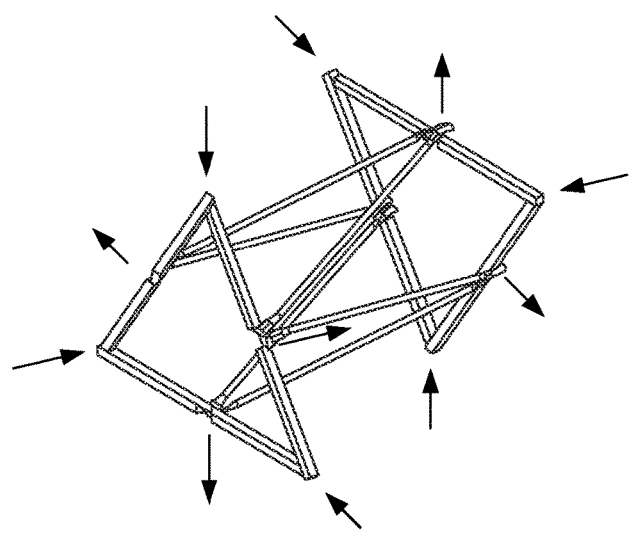
Figure 13D:
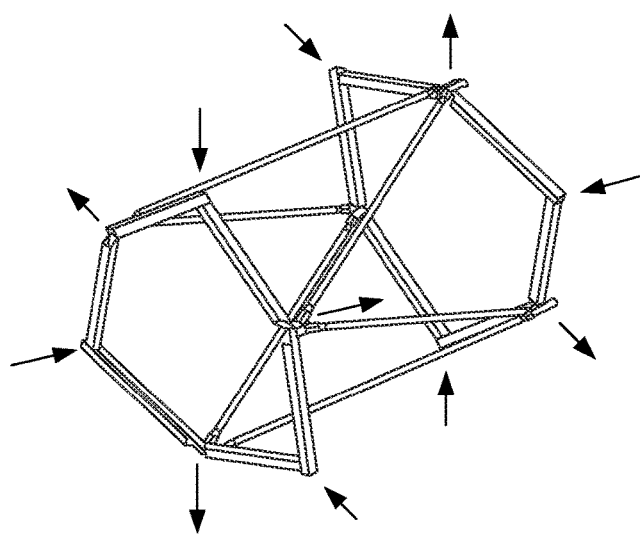
Figure 13E:
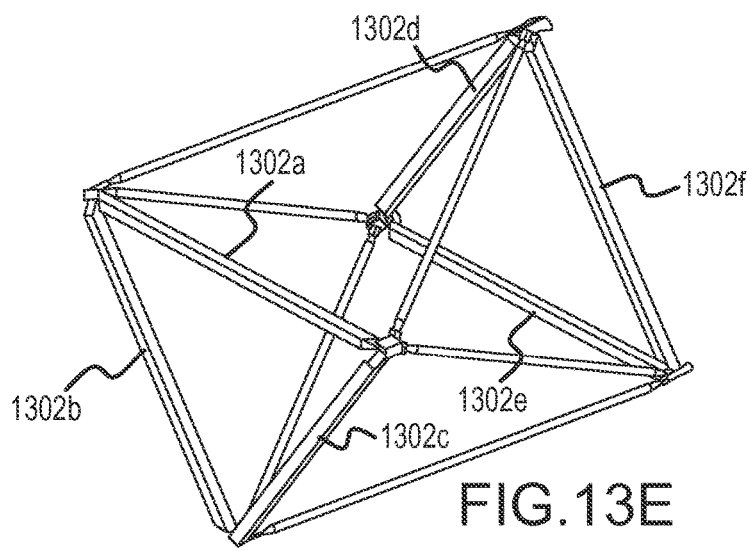

Once attached to the hubs, the folding transverse frame members 1302a-1302f may be unfolded while the axial frame members are drawn apart, as shown in FIGS. 13C and 13D illustrating progressive stages in the unfolding of the subassembly 1300. Once the folding transverse frame members 1302a-1302f are straightened, they form the primary structural shapes of the bay being assembled, and are transverse to the axis of the eventual three-dimensional structural frame. The folding transverse members may then be fastened in their straight configurations, and additional fasteners put in place to fully fasten the axial frame members to the hubs, thus completing the bay. Other bays may be formed in a similar manner and joined together to form a three-dimensional structural frame such as the three-dimensional structural frame 600. A reflector may be added to complete a solar collector module.

The present invention has been described above in terms of presently preferred embodiments so that an understanding of the present invention can be conveyed. There are, however, many configurations for collector systems not specifically described herein but with which the present invention is applicable. The present invention should therefore not be seen as limited to the particular embodiments described herein, but rather, it should be understood that the present invention has wide applicability with respect to collector systems generally. All modifications, variations, or equivalent arrangements and implementations that are within the scope of the attached claims should therefore be considered within the scope of the invention.

What is claimed is:

1. A solar collector module comprising:
   a three-dimensional structural frame, comprising:
   a set of primary structural shapes spaced apart from each other in parallel planar spaced relation along one and the same longitudinal axis of the structural frame, each primary structural shape including a set of frame members arranged in a polygonal shape, any one primary structural shape of the set of primary structural shapes being rotated about the one and only longitudinal axis so as to be angularly offset with respect to an adjacent primary structural shape of the set of primary structural shapes, wherein each of the set of primary structural shapes is disposed perpendicular to the one and only longitudinal axis, and
   a set of axial frame members, joining corners of adjacent primary structural shapes such that the axial frame members form helical paths for a transmission of torque from one structural end of the structural frame to another structural end of the structural frame;
   a reflector coupled to the three-dimensional structural frame and shaped to concentrate solar radiation to a focal line; and
   a plurality of reflector support structures, each of the plurality of reflector support structures attached to the three-dimensional structural frame at an axial position coinciding with one edge of a respective one of the primary structural shapes;
   a plurality of receiver supports attached to the three-dimensional structural frame; and
   a receiver tube supported by the plurality of receiver supports and positioned at the focal line of the reflector, to receive concentrated solar radiation from the reflector.

2. The solar collector module of claim 1, wherein the reflector is cantilevered beyond edges of the three-dimensional structural frame.

3. The solar collector module of claim 1, wherein the reflector is in the shape of a parabolic cylinder.

4. The solar collector module of claim 1, wherein the reflector support structures are attached to the structural frame at axial positions coinciding with alternate primary structural shapes.

5. The solar collector module of claim 1, wherein the reflector comprises a plurality of reflector panels, each reflector panel being concave along its width.

6. The solar collector module of claim 1, wherein the reflector comprises a plurality of reflector panels, each reflector panel being concave along its length.

7. The solar collector module of claim 1, wherein each primary structural shape comprises three and only three frame members.

8. The solar collector module of claim 1, wherein each primary structural shape comprises four and only four frame members.

9. The solar collector module of claim 1, wherein the primary structural shapes are regular polygonal shapes.

10. The solar collector module of claim 1, wherein all of the primary structural shapes are identical.

11. The solar collector module of claim 1, wherein all of the frame members in all of the primary structural shapes are identical.

12. A solar collector module comprising:
    a three-dimensional structural frame, comprising:
    a set of primary structural shapes spaced apart from each other in parallel planar spaced relation along one and the same longitudinal axis of the structural frame, each primary structural shape including a set of frame members arranged in a polygonal shape, any one primary structural shape of the set of primary structural shapes being rotated about the one and only longitudinal axis so as to be angularly offset with respect to an adjacent primary structural shape of the set of primary structural shapes, wherein each of the set of primary structural shapes is disposed perpendicular to the one and only longitudinal axis, and a set of axial frame members, joining corners of adjacent primary structural shapes such that the axial frame members form helical paths for a transmission of torque from one structural end of the structural frame to another structural end of the structural frame;

a reflector coupled to the three-dimensional structural frame and shaped to concentrate solar radiation onto a receiver; and a plurality of reflector support structures, each of the plurality of reflector support structures attached to the three-dimensional structural frame at an axial position coinciding with one edge of a respective one of the primary structural shapes;

wherein all of the axial members are identical.

13. The solar collector module of claim 12, wherein all of the frame members in all of the primary structural shapes and all of the axial members are identical.

14. The solar collector module of claim 1, further comprising a hub at each corner of each primary structural shape, wherein all of the frame members meeting at each respective primary structural shape corner are joined to the respective hub.

15. The solar collector module of claim 14, wherein at least one hub comprises:

a bent plate having a concave side and including features for connecting the axial frame members meeting at the hub; and a transverse plate fixed transverse to the concave side of the bent plate and transverse to the longitudinal axis of the structural frame, the transverse plate including features for connecting the frame members of the respective primary structural shape meeting at the hub.

16. The solar collector module of claim 14, wherein all of the hubs are identical.

17. The solar collector module of claim 1, wherein ends of at least two frame members are formed into flanges, and the two frame members having the flanges are directly joined using the flanges without the use of a separate hub.

18. The solar collector module of claim 17, further comprising fasteners joining the flanges of the two frame members, wherein the fasteners are in single shear.

19. The solar collector module of claim 17, further comprising fasteners joining the flanges of the two frame members, wherein the fasteners are in double shear.

20. The solar collector module of claim 17, wherein ends of all of the frame members are formed into flanges, and the connections between frame members are made by directly connecting the respective flanges, without the use of a separate hub.

21. The solar collector module of claim 1, wherein the three-dimensional structural frame is foldable into a generally linear configuration.

22. The solar collector module of claim 1, wherein the set of axial members comprises at least four axial members, and wherein for at least one pair of adjacent axial members, the members of the respective pair are attached to a common hub at a first end, and to different hubs at a second end.

23. The solar collector module of claim 1, one primary structural shape of the set of primary structural shapes is rotated by approximately 45° about the longitudinal axis with respect to an adjacent primary structural shape of the set of primary structural shapes.

24. The solar collector module of claim 1, wherein the reflector comprises a plurality of composite panels, each of which is supported at only two spaced-apart locations, and wherein each composite panel includes a structural material sandwiched between two outer sheets.

25. The solar collector module of claim 1, wherein each of the plurality of reflector support structures spaces the reflector away from the primary structural shape coinciding with the respective reflector support.

26. A solar collector module comprising:

a three-dimensional structural frame, comprising:

a set of primary structural shapes spaced apart from each other in parallel planar spaced relation along one and the same longitudinal axis of the structural frame, each primary structural shape including a set of frame members arranged in a polygonal shape, any one primary structural shape of the set of primary structural shapes being rotated about the one and only longitudinal axis so as to be angularly offset with respect to an adjacent primary structural shape of the set of primary structural shapes, wherein each of the set of primary structural shapes is disposed perpendicular to the one and only longitudinal axis, and a set of axial frame members, joining corners of adjacent primary structural shapes such that the axial frame members form helical paths for a transmission of torque from one structural end of the structural frame to another structural end of the structural frame;

a reflector coupled to the three-dimensional structural frame and shaped to concentrate solar radiation onto a receiver; and a plurality of reflector support structures, each of the plurality of reflector support structures attached to the three-dimensional structural frame at an axial position coinciding with one edge of a respective one of the primary structural shapes;

wherein the primary structural shapes are spaced evenly along the one and only longitudinal axis.

* * * * *